United States Patent [19]
Ikedo et al.

[11] Patent Number: 4,788,673
[45] Date of Patent: Nov. 29, 1988

[54] MULTI-DISK PLAYER SYSTEM

[75] Inventors: Yuji Ikedo; Takahiro Okajima; Masahiko Miyake; Tsutomu Miyakawa, all of Saitama, Japan

[73] Assignee: Pioneer Electronic Corporation, Tokyo, Japan

[21] Appl. No.: 63,041

[22] Filed: Jul. 31, 1987

Related U.S. Application Data

[63] Continuation of Ser. No. 837,121, Mar. 7, 1986, Pat. No. 4,730,291.

[30] Foreign Application Priority Data

| Mar. 8, 1985 | [JP] | Japan | 60-46208 |
| Mar. 8, 1985 | [JP] | Japan | 60-46209 |
| Mar. 8, 1985 | [JP] | Japan | 60-46211 |
| May 15, 1985 | [JP] | Japan | 60-104301 |

[51] Int. Cl.$^4$ .............................................. G11B 23/03
[52] U.S. Cl. ................................ 369/36; 206/312; 206/444; 360/133
[58] Field of Search ............... 369/36, 38, 39; 206/31, 206/309, 444; 360/133, 98

[56] References Cited

U.S. PATENT DOCUMENTS

| 2,174,273 | 9/1939 | Mitchell | 369/39 |
| 4,561,078 | 12/1985 | Hakayama | 369/38 |

FOREIGN PATENT DOCUMENTS

| 139161 | 5/1985 | European Pat. Off. | 206/309 |
| 135373 | 10/1980 | Japan | 206/309 |
| 5466 | 1/1984 | Japan | 206/309 |
| 206981 | 9/1986 | Japan | 206/444 |

OTHER PUBLICATIONS

"Container for Recording Disks", Cox et al., IBM Technical Disclosure Bulletin, vol. 17, No. 12, 5/75, p. 3745.

Primary Examiner—Steven L. Stephan
Attorney, Agent, or Firm—Sughrue, Mion, Zinn, Macpeak & Seas

[57] ABSTRACT

A multi-disk player system comprising a housing, a playing mechanism provided within the housing, a magazine that is capable of accommodating a plurality of disks in an orderly manner and which is provided detachably with respect to the housing, a magazine loading detector for detecting the loading of said magazine within the housing, and a disk pickup and transport device that selects a desired disk from the magazine and transports the same to the play position. The magazine loading detector is comprised of a pair of push levers that are positioned in the deepest magazine loading area and are in engagement with the magazine, a pair of sensor switches capable of engaging with the push levers. The push levers are spaced apart from each other by the distance corresponding to the thick portion of the magazine. The system may include a disk container comprising a plurality of trays on which disks are to be placed, and the magazine for accommodating the trays. The magazine is provided with partitions that limit the vertical position of the trays. The height of the underside of each partition is set at a value equal to that of the top of the disk placed on the tray below each partition.

6 Claims, 23 Drawing Sheets

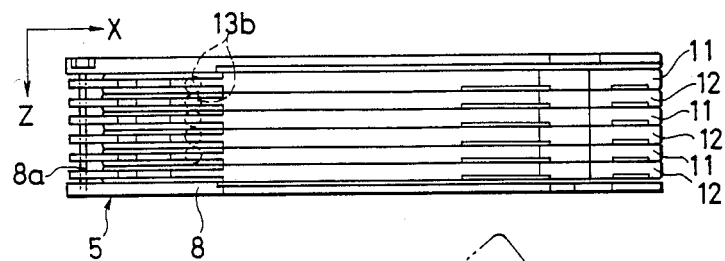
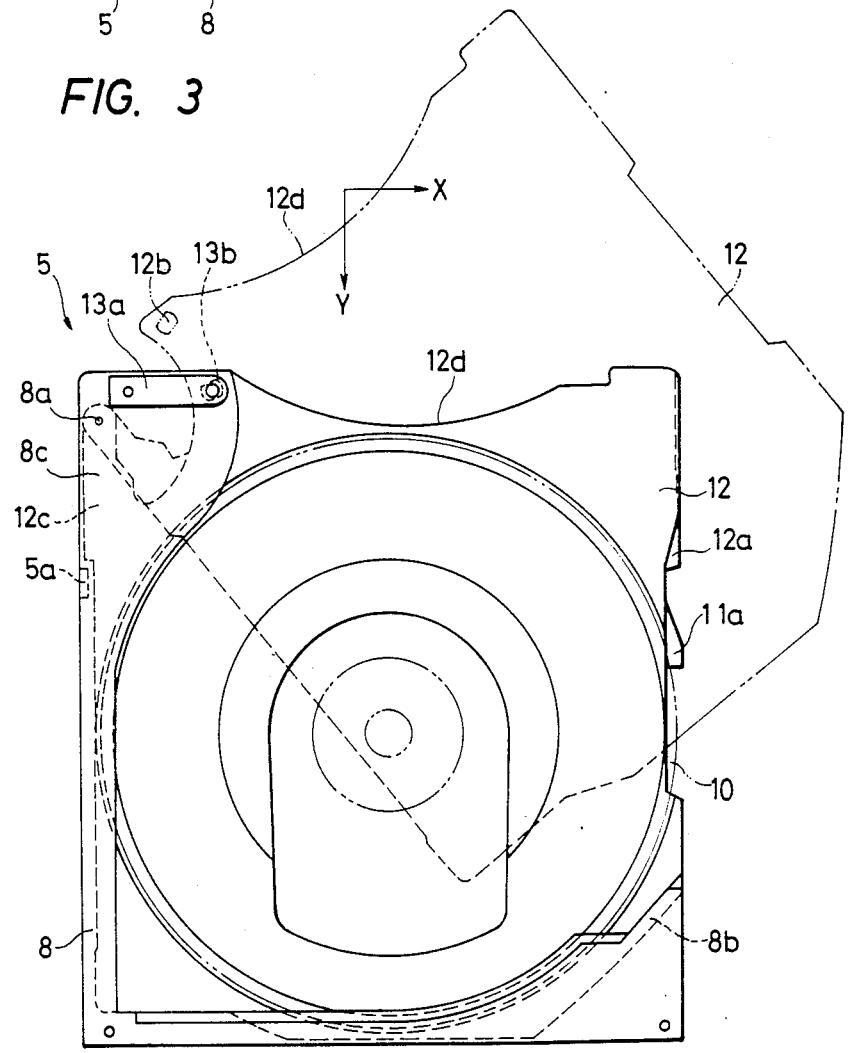

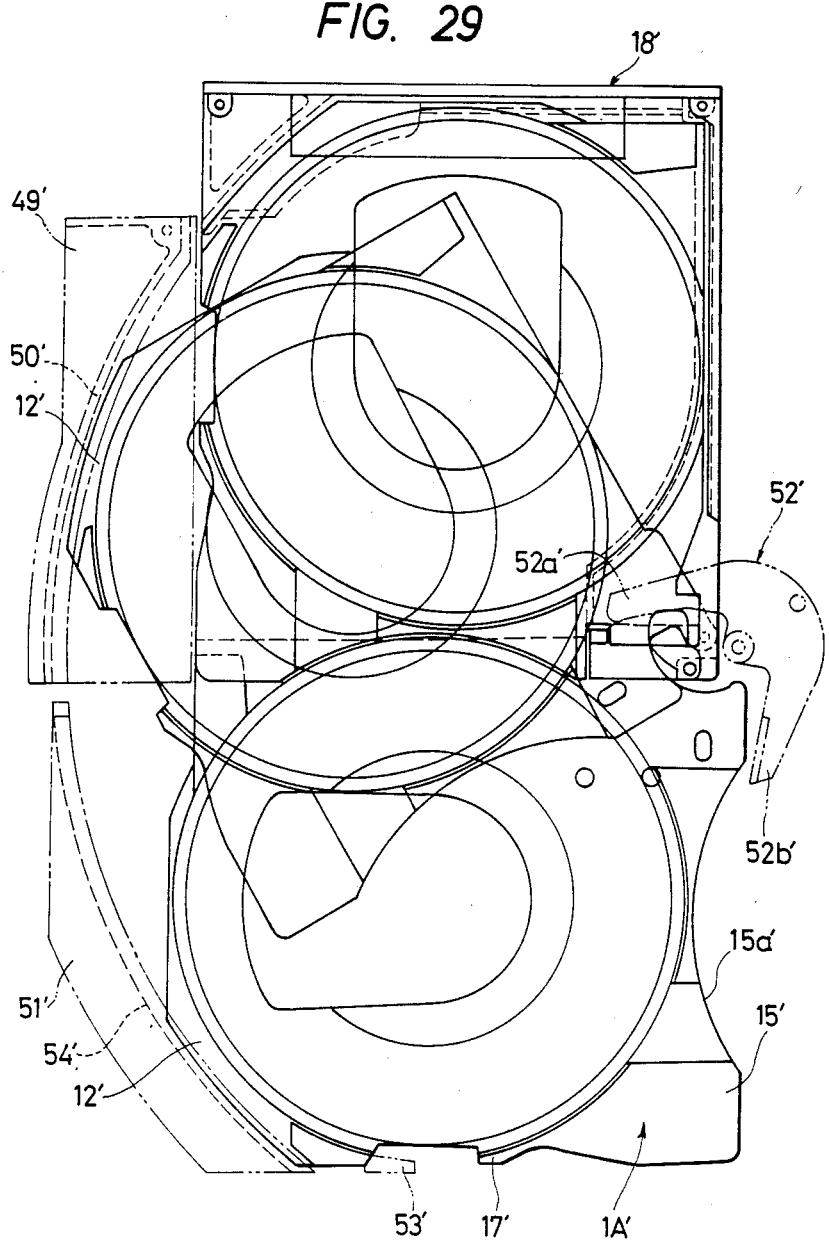

MULTI-DISK PLAYER SYSTEM

This is a continuation of application Ser. No. 837,121 filed Mar. 7, 1986 now U.S. Pat. No. 4,730,291.

BACKGROUND OF THE INVENTION

The present invention relates to a disk player system, and more particularly, to a multi-disk player system that is capable of accommodating a plurality of disks and which enables continuous playing of music on a series of randomly selected disks.

The jukebox may be regarded as a common type of multi-disk player, but the conventional jukebox is contained within a very large cabinet and is not suitable for use at home.

With the recent advance in digital recording technology, several types of digital audio disks (hereinafter abbreviated as DAD) have been developed and are in extensive use. Compared with the conventional analog audio disks, DADs feature an increased information capacity and a reduced noise problem during reproduction. Small-sized DADs (o.d. of about 12 cm) are commonly referred to as compact disks which are adapted to have signals written and read thereon by a laser beam; compact disks are simple to use and enable reduction in the overall size of the disk player. Making use of these features of small-sized DADs, audio makers have recently developed a multi-disk player which is ideal as a home jukebox and which is capable of continuous playing of a plurality of (typically 5 or 6) compact disks. it is worth nothing that a single compact disk can play approximately one hour, which is equivalent to about 1.5 times the information capacity of the conventional analog audio disk. This means that 6 compact disks have a capacity of about 120 pieces of music assuming that each piece continues for a period of 3 minutes on average, and as a result, the listener can make his own music library containing favorite pieces in magazines classified by genre such as jazz, chanson or classics.

The basic components of the multi-disk player are a playing means including a turntable and a pickup, a magazine containing a series of disks disposed at a given pitch in an orderly manner, and a disk pickup and transport mechanism that selects a desired disk from the magazine and transports the same to the play position, or on to the turntable.

With the currently available multi-disk players, the listener who wants to play a disk on which is recorded a piece of music of a certain genre such as jazz must first withdraw from the player housing the magazine containing a disk on which are recorded pieces of another genre and then replace said magazine by the one containing the disk with the desired piece; alternatively, any one of the disks within a magazine for another genre that has been withdrawn from the player housing is replaced by the desired disk and the magazine now containing the desired disk is re-loaded into the player housing. If the listener wants to play more than one disk, he must repeat either one fo the procedures described above for each disk. Therefore, the user of the conventional multi-disk player also finds it cumbersome to replace disks on the player.

SUMMARY OF THE INVENTION

The present invention has been accomplished in order to solve the aforementioned problem, and the primary objective of the invention is to provide a multi-disk player that features great ease in disk loading and replacement.

The multi-disk player of the present invention incorporates a magazine loading detector that checks to see if the magazine accommodating a plurality of disks in an orderly manner has been properly loaded into the player housing. This detector is comprised of a pair of push levers that are positioned in the deepest magazine loading area and are in engagement with said magazine, and a pair of sensor switches capable of engaging with said push levers, said push levers being spaced apart from each other by the distance corresponding to the thick portion of said magazine.

BRIEF DESCRIPTION OF THE DRAWINGS

FIGS. 2 to 5 are illustrations of the magazine used in the multi-disk player of the present invention;

FIG. 29 is a plan view showing the operation of the same disk container when it is employed with an automatic player.

DETAILED DESCRIPTION OF THE PREFERRED EMBODIMENTS

Figure 1:
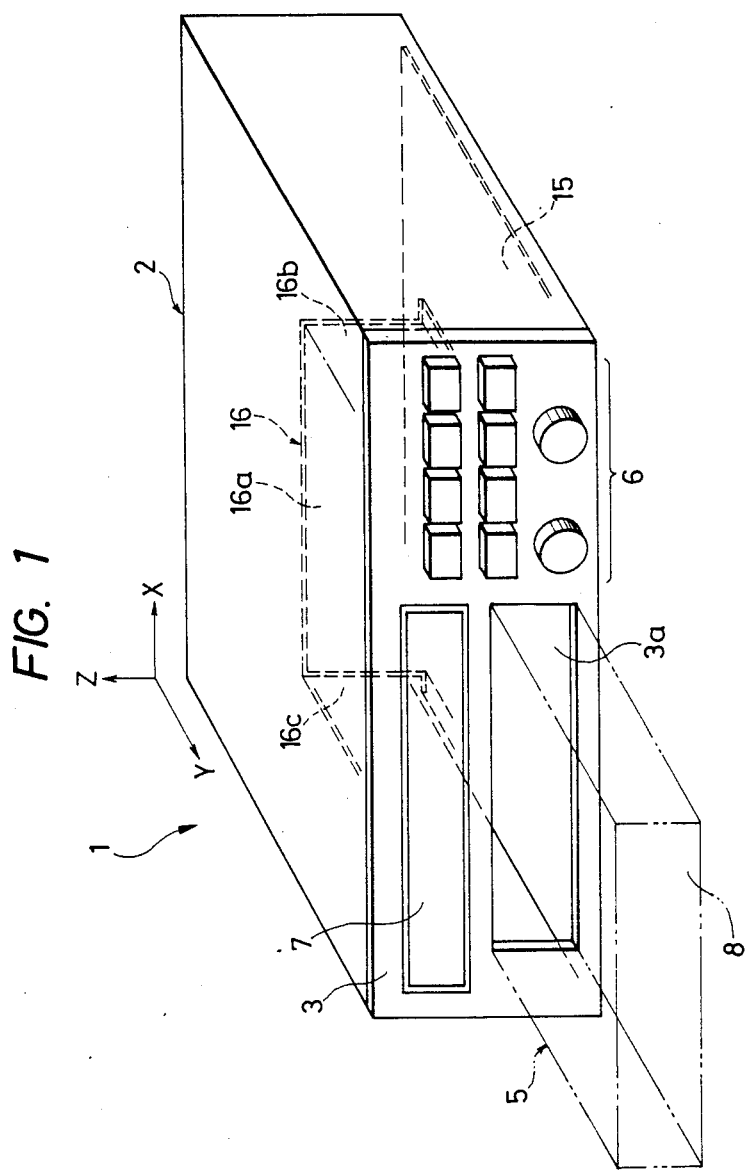
FIG. 1 is a perspective view showing the multi-disk player of the present invention in its entirety.

The multi-disk player according to one embodiment of the present invention is hereunder described with reference to the accompanying drawings, wherein the reference numeral 1 denotes the front portion of the multi-disk player.

As shown in FIG. 1, the front panel 3 of the housing 2 is provided with a rectangular opening 3a for accommodating a magazine 5 within the housing. The opening 3a extends both rightward and leftward with respect to the forward direction indicated by the arrow Y, and the left-ward direction is indicated by the arrow X. The arrow Z indicates the upward direction. The front panel 3 is also provided with a group of control buttons 6 for manipulating the multi-disk player, and with a display 7.

Figure 4:
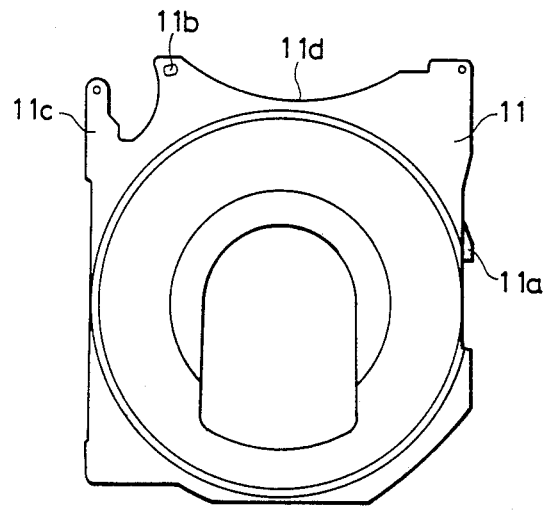
Figure 5:
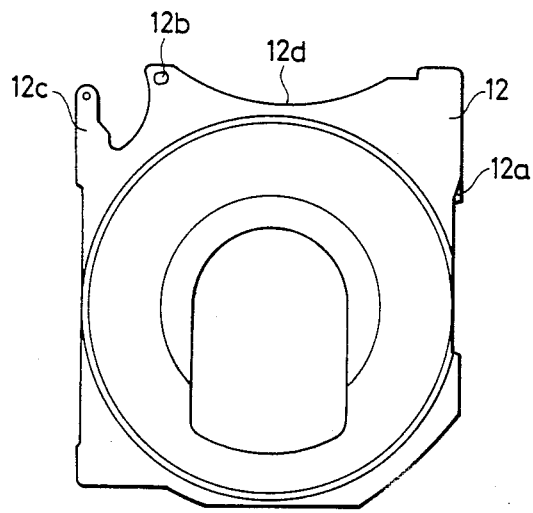

As shown in FIGS. 2 and 3, the magazine 5 is composed of a generally flat parallelepiped body 8, and two sets of three trays A and B, in the form of a rectangular plate, each carrying a disk 10 on its major surface. A set of trays A 11, a set of trays B 12 and, hence, the disks 10 are accommodated in an orderly fashion at a given pitch in a direction perpendicular to the disk-carrying face of a turntable (to be described hereinafter), or in this case in the vertical direction (both in the direction indicated by the arrow Z and in the opposite direction). Each of the trays A 11 and trays B 12 is provided rotatably about shaft 8a that extends through the magazine body 8 at its right rear end in the vertical direction (in which the trays are stacked); each tray is capable of moving on its major surface such that it is accommodated within or projects from the magazine body 8. Details of a tray A 11 are shown in FIG. 4, and those of a tray B 12 in FIG. 5. Both trays are essentially identical in shape and the only difference lies in the shape and position of a claw 11a (or 12a) by which the listener withdraws a tray A 11 (or B 12) from the magazine body 8 with a finger. The trays A 11 and B 12 are stacked such that a tray A alternates with a tray B. The magazine body 8 is provided in the vicinity of the shaft 8a with a leaf spring 13a and five ball members 13b that are disposed in alignment in the direction in which the trays are stacked and which are movably fitted in small openings 11b and 12b that are formed in the respective trays. Each ball member 13b has a diameter equal to the pitch for the arrangement of the trays 11 and 12, and is biased with the force of the leaf spring 13a that counteracts the moving of each tray. The leaf spring 13a combined with the ball members 13b ensures that when one tray is in a position projecting from the magazine body 8, no other tray will project from that body.

As shown in FIG. 1, a bottom plate 15 is fixed in the housing 2 and a chassis 16 as a supporting member is mounted on the bottom plate 15. The chassis 16 is comprised of a planar portion 16a that extends in forward and backward directions (the direction indicated by the arrow Y and the opposite direction) and in leftward and rightward directions (the direction indicated by the arrow X and the opposite direction), and a pair of upright or erect portions 16b and 16c that are continuous from the left and right hand ends of the planar portion 16a and which extend in both the forward/backward directions and in the upward/downward directions (i.e., the direction indicated by the arrow Z and the opposite direction, or in which the trays are stacked).

As shown in FIGS. 6 to 10, a moving member 18 is disposed between the rear ends of the pair of erect portions 16b and 16c in such a manner that it is movable in the vertical direction, or in the direction in which the trays 11 and 12 are stacked. Stated more specifically, the moving member 18 is composed of resin-made movable chassis A 19 (see FIGS. 11A and 11B which is connected by, for example, screws to a steel-made tabular movable chassis B 20 (see FIG. 12) in such a manner that the movable chassis A 19 is fixed to the upper surface of the movable chassis B 20.

Figure 11A:
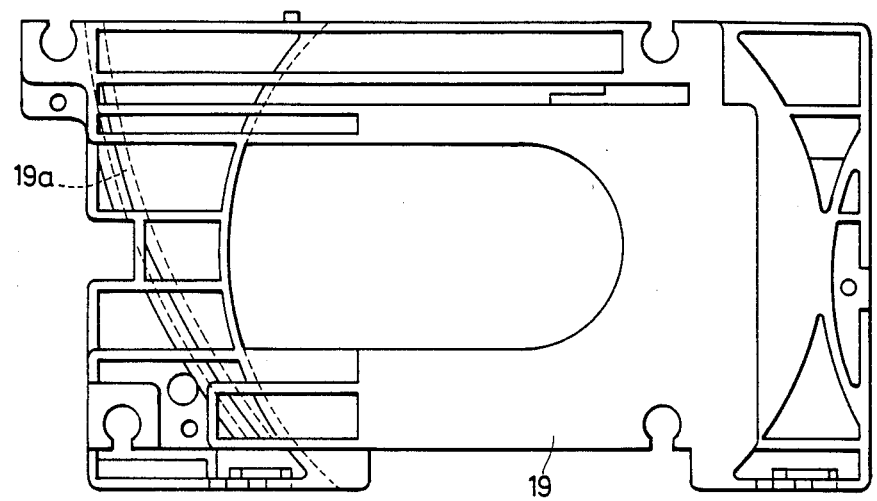
FIGS. 11A to 19B show details of several parts of the internal structure of the multi-disk player.
Figure 11B:
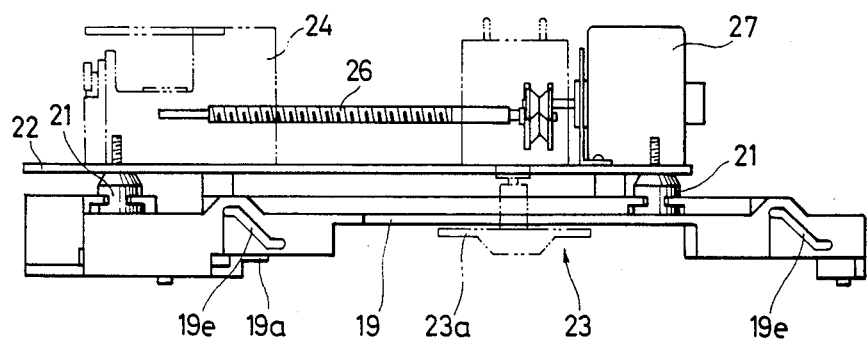

As is evident from FIG. 11B, the upper surface of the resin-made movable chassis A 19 is provided with a carrier plate 22, with an anti-vibration member 21 (typically made of rubber) being inserted between the two members. A turntable 23 is mounted on the carrier plate 22. On the carrier plate 22 is also provided a carriage 24 bearing an optical pickup means; this carriage 24 is mounted on the carrier plate 22 such that it is movable within a plane including the disk bearing surface 23a of the turntable 23 in leftward and rightward directions (the direction indicated by the arrow X and the opposite direction). The carrier plate 22 is also provided with a means for driving the carriage 24 that is essentially composed of a screw shaft 26 threaded into part of the carriage 24 and a motor 27 for imparting a rotational force to said screw shaft.

The turntable 23, the carriage 24 including the optical pickup means, and the carriage drive means combine together to form a means for playing disks. This playing means is carried on the moving member 18 and is caused to move together with said moving member 18 in the vertical direction (i.e., both in the direction indicated by the arrow Z and in the opposite direction).

As shown in FIGS. 11A and 11B, the underside of the movable chassis A 19 is provided with an arched guide face 19a which is capable of making sliding contact with the rotating end of each of the trays 11 and 12 that projects from the magazine body 8.

Figure 12:
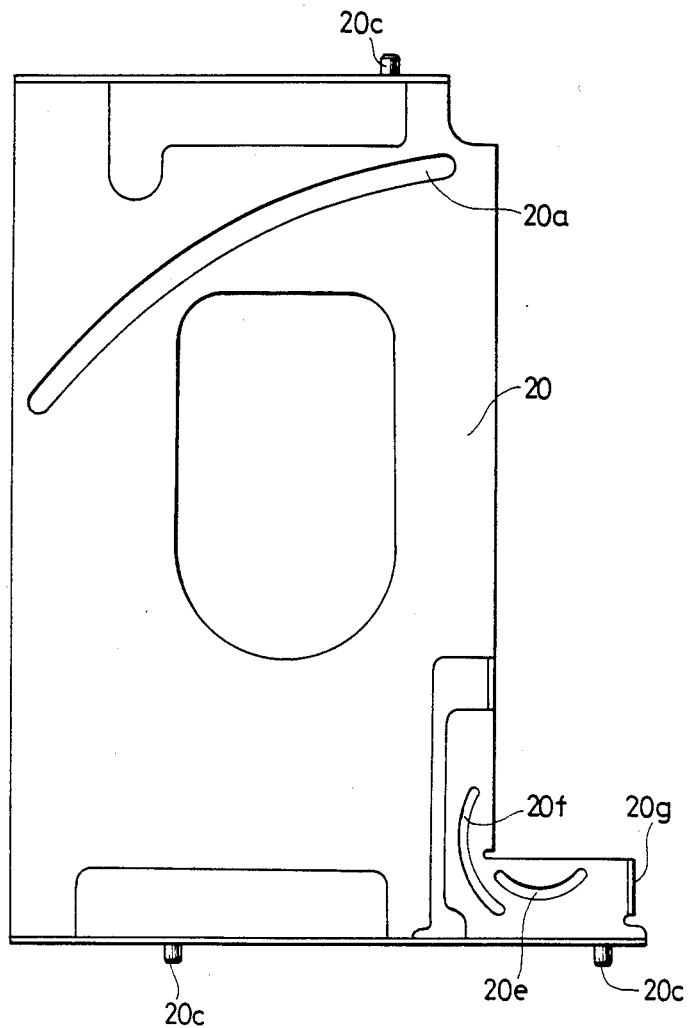

As shown in FIG. 12, the upper side of the movable chassis B 20 is provided with an arched guide projection 20a that is in a face-to-face relationship with the arched guide face 19a and spaced therefrom by a distance far greater than the thickness gage of each of the trays 11 and 12 and which is capable of making sliding contact with the rotating end of each tray. The arched guide face 19a combines with the arched guide projection 20a to form a tray guide for guiding a single tray projecting from the magazine body 8.

Figure 6:
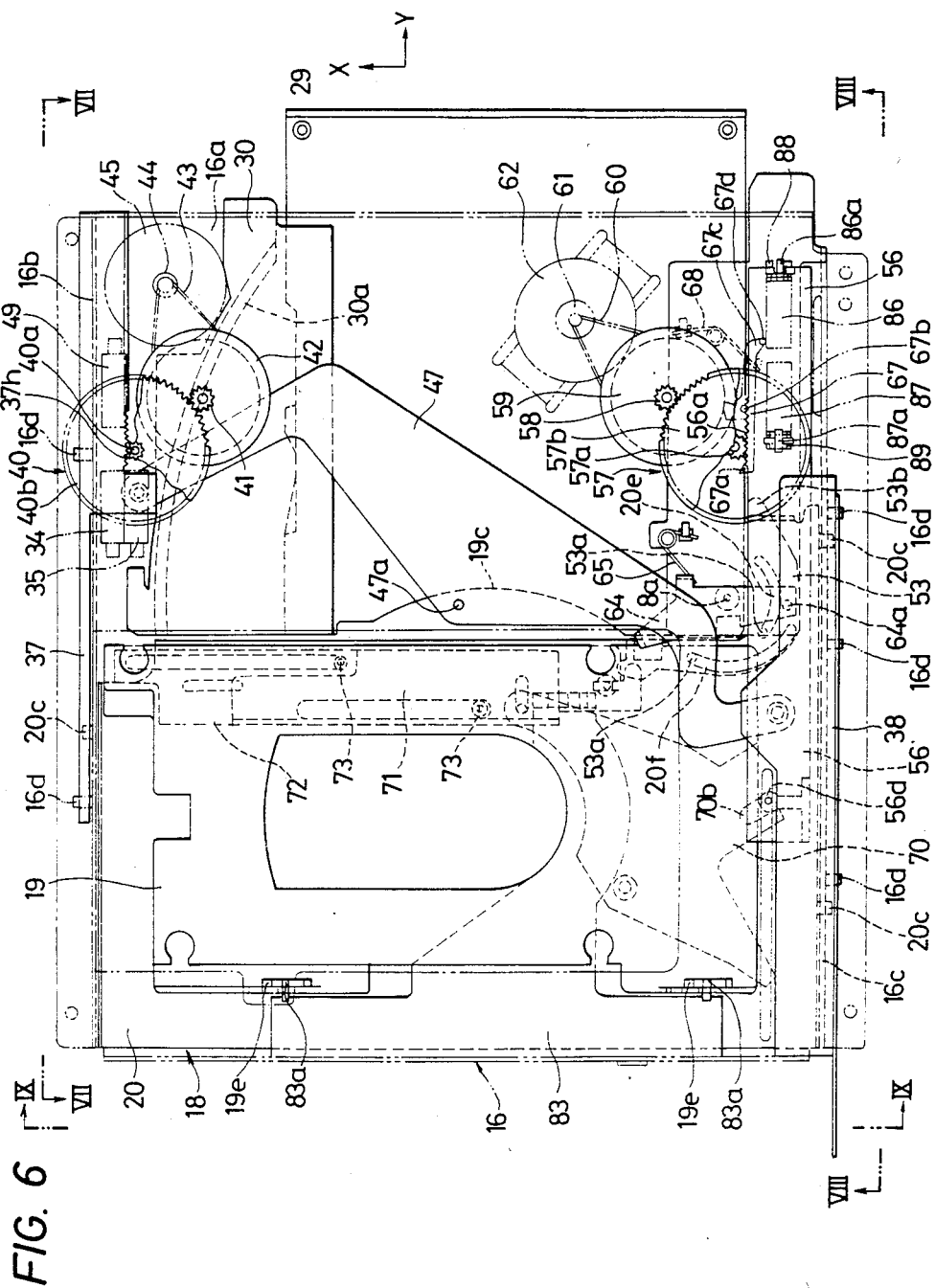
FIG. 6 is a plan view showing the internal structure of the multi-disk player of the present invention.
Figure 9:
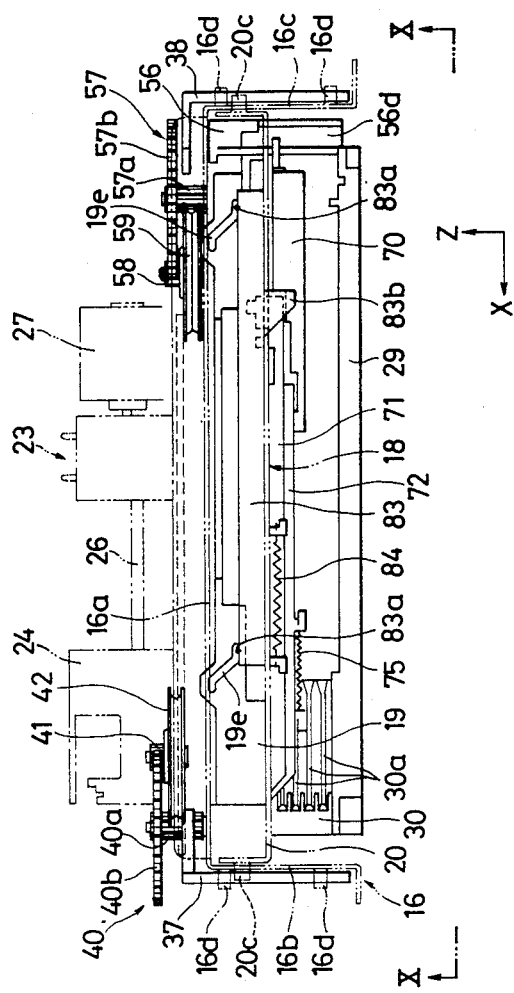
Figure 10:
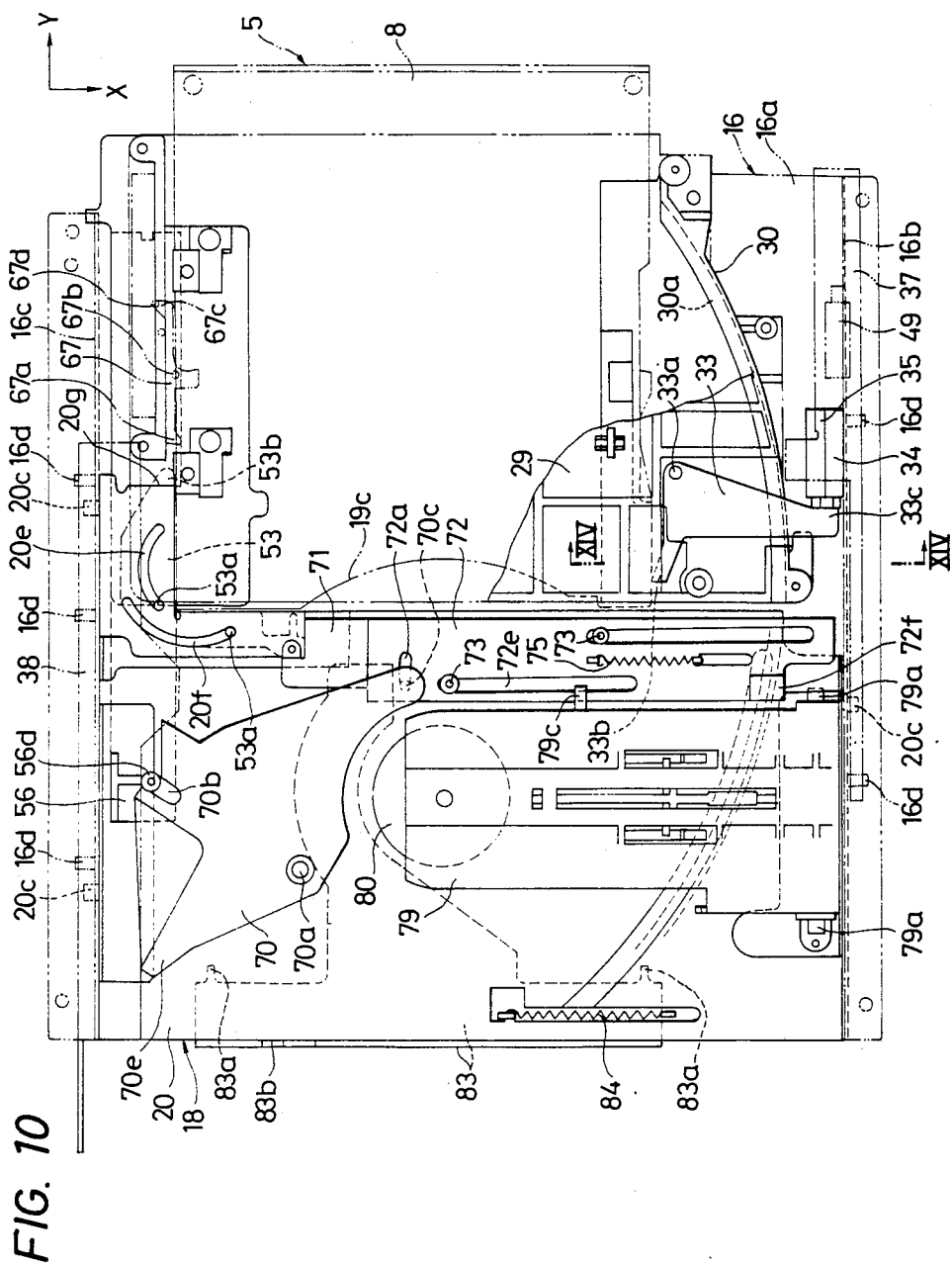
FIG. 10 is a section of FIG. 9 taken on line X—X.
Figure 13:
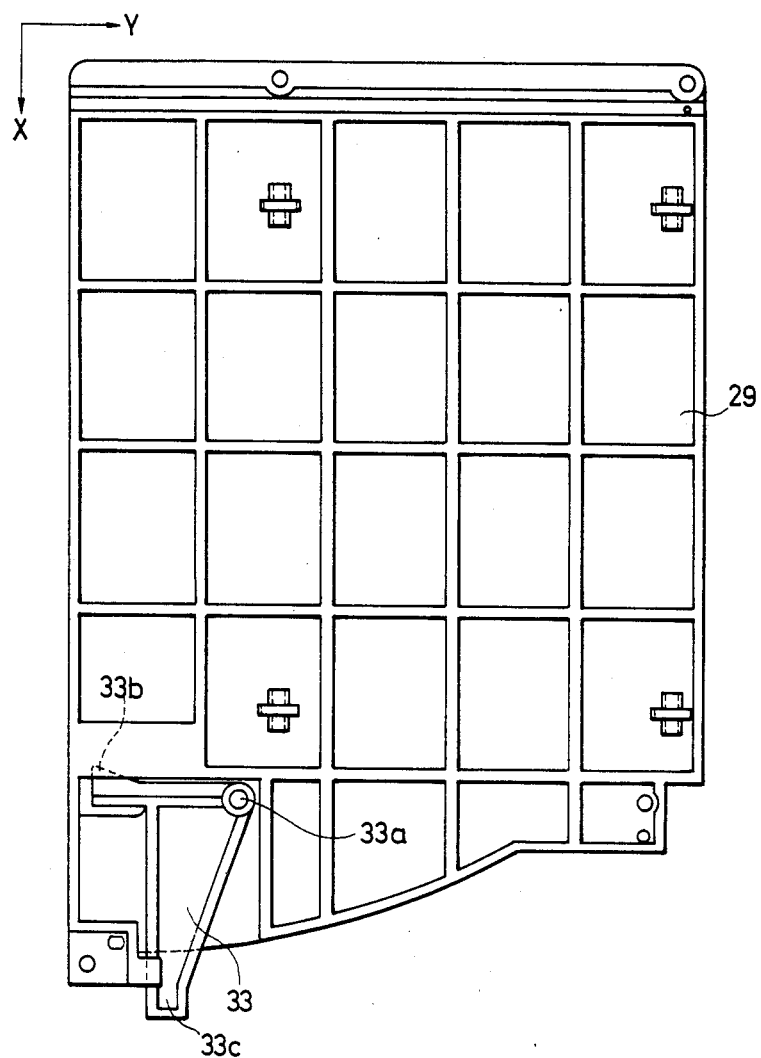

As shown in FIGS. 6, 9 and 10, a tabular guide/hold member 29 that makes sliding contact with the underside of the magazine 5 for guiding and holding the latter is disposed between the front ends of the erect portions 16b and 16c of the chassis 16. This member 29 is secured to the planar portion 16a of the chassis 16 by, for example, a screw. Details of the guide/hold member 29 are shown in FIG. 13. A tray guide member 30 is provided on top of the left end of the guide/hold member 29. The tray guide member 30 is provided with a plurality of arched tray guide grooves 30a that are positioned between the tray guide (composed of the arched guide face 19a and the arched guide projection 20a) and the tray guide channel in the magaziine body 8 and which are continuous from each of these members. The trays 11 and 12 projection from the magazine body 8 slide along the tray guide grooves 30a as they are kept in engagement therewith and are thereafter guided into the already described tray guide on the moving member 18. The tray guide channel in the magazine body 8 is composed of parts 8c and 8b (see FIG. 3) and is provided with a plurality of guide grooves (not shown) similar to the guide grooves 30a.

Figure 14:
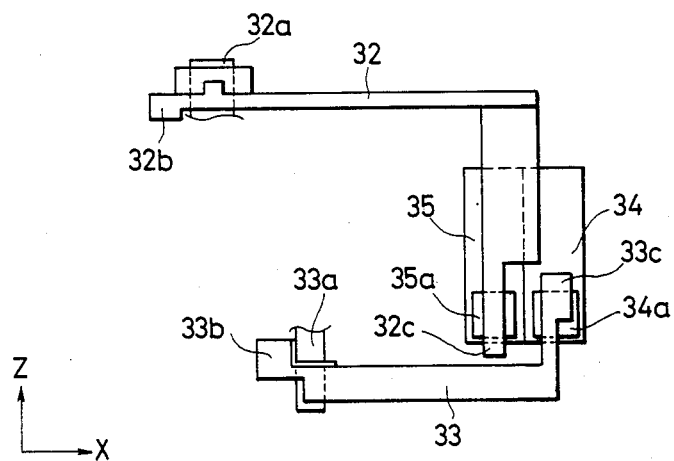

As shown in FIGS. 10, 13 and 14, a pair of push levers 32 and 33 that are spaced apart from each other in the vertical direction (both in the direction indicated by the arrow Z and in the opposite direction) by the distance corresponding to the thick portion of the magazine 5 are provided in the deepest magazine loading area. The push levers 32 and 33 are swingable on pins 32a and 33a, respectively. The upper push lever 32 is mounted on the aforementioned tray guide member 30, while the lower push lever 33 is mounted on the guide/hold member 29. The push lever 32 (or 33) engages with the rear end of the magazine at one swinging end 32b (or 33b) such that said push lever is swing in the counterclockwise direction with reference to FIG. 10. In front of the push lever 32 (or 33) is provided a sensor switch 34 (or 35) such that the other swinging end 32c (or 33c) of the swing push lever actuates the swtch 34 (or 35) by means of engagement with an actuator 34a (or 35a). The push levers 32 and 33 as eombined with the pair of sensor switches 34 and 35 form a magazine loading detector that detects the loading of the magazine 5 within the housing 2 at the proper loading area.

The moving member 18 composed of the movable chassis A 19 and the movable chassis B 20 is moved in the vertical direction (both in the direction indicated by the arrow Z and in the opposite direction) by the moving member moving means which is described hereinafter.

As shown in FIGS. 6 to 10, the outer surface of the left- and right-hand erection portions, 16b and 16c, of the chassis 16 are provided with a pair of moving members 37 and 38, which are longitudinally moving plates that extend in forward and backward directions. As is evident from FIGS. 7 and 8, the moving plate 37 (or 38) is provided with guide grooves 37a and 37b (or 38a and 38b) that extend in the direction in which said moving plate extends and both moving plates 37 and 38 are mounted on the supporting chassis 16 by means of the respective guide grooves which are movably fitted over pins 16d studded on the outer surfaces of the erect portions 16b and 16c. As a result, the moving plates 37 and 38 are capable of reciprocating in forward and backward directions.

For the purpose of the following discussion, let the moving member 18 composed of the movable chassis A 19 and the movable chassis B 20 be referred to as the first moving member, and let the combination of the moving plates 37 and 38 be called the second moving member. As is clear from FIGS. 7 and 8, the guide grooves 37b and 38b are formed in the moving plates 37 and 38, respectively, at positions closer to one side with respect to the direction in which these plates are moved (i.e., the lower side in the embodiment shown), but the other set of guide grooves 37a and 38a are not positioned so much closer to the lower side of either plate.

The movable chassis B 20 which is one of the two components of the first moving member 18 is provided with three prjecting pins 20c, one being on the left side and two on the right side. As is clear from FIGS. 7 and 8, one pin 20c is movably fitted through a guide groove 16e formed in the vertical direction in the left-hand erect portion 16b of the supporting chassis 16, while the other two pins 20c are movably fitted through guide grooves 16e formed in the vertical direction in the right-hand erect portion 16c of the chassis 16. By this arrangement, the movable chassis B 20 is guided in the vertical direction.

For the purpose of the following description, let the guide grooves 16e formed in the chassis 16 be referred to as the first group of guide grooves, and let the guide grooves 37b and 38b formed in the moving plates 37 and 38 (i.e., forming the second moving member) be named the second group of guide grooves.

The pins 20c studded on both the right and left sides of the movable chassis B 20 project to the outside of the chassis 16 through the guide grooves 16e formed in that chassis, and cam grooves 37d and 38d formed in the inside surfaces of the moving plates 37 and 38 (i.e., forming the second moving member) are in movable engagement with these pins 20c. The overall shape of the cam groove 37d formed in the moving plate 37 is such that it is inclined both in the forward direction (as indicaed by the arrow Y) and in the downward direction (opposite to the direction indicated by the arrow Z). On the other hand, the overall shape of the cam groove 38d formed in the moving plate 38 is such that it is inclined both in the forward direction and in the upward direction. In other words, the cam grooves 37d and 38d are formed such that when the moving plates 37 and 38 (i.e., forming the second moving member) make relative movements, the first moving member 18 (composed of the movable chassis A 19 and the movable chassis B 20) will move in the vertical direction.

Figure 7:
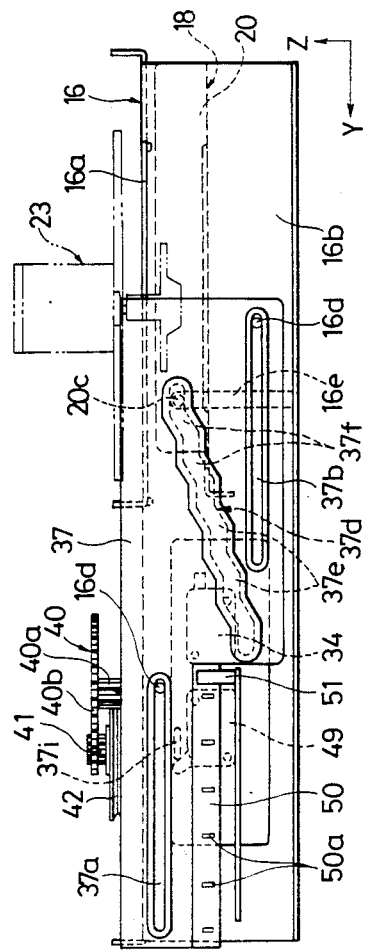
FIGS. 7 to 9 are sections of FIG. 6 taken on lines VII—VII, VIII—VIII and IX—IX, respectively.
Figure 8:
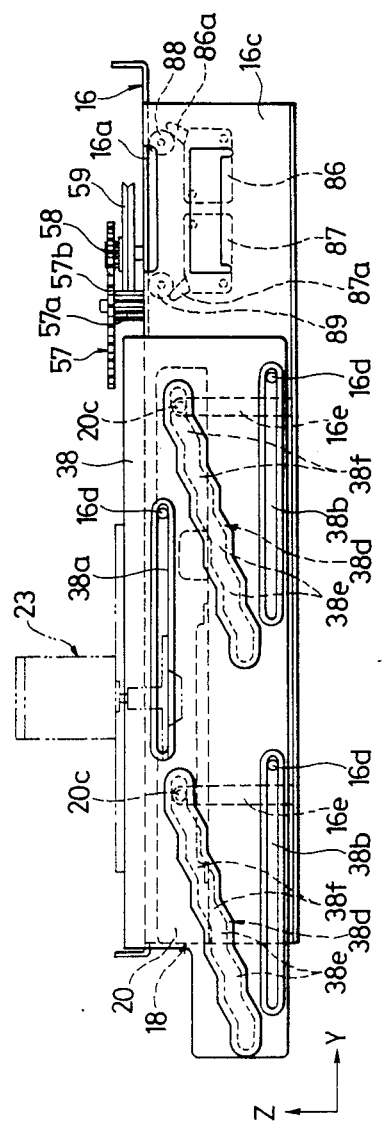

The cam groove 37d (or 38d) is formed between the guide groove 37b (or 38b), which is formed on one side (i.e., lower side) with respect to the direction in which the moving plate 37 (or 38) moves, and the other side (i.e., upper side) of said moving plate. The cam groove 37d (or 38d) is composed of 6 linear portions 37e (or 38e) extending in the direction in which the moving plate 37 (or 38) moves (i.e., in forward and backward directions) and 5 bridge portions 37f (or 38f) that connect these linear portions and are inclined with respect thereto; because of this arrangement, the cam groove 37d (or 38d) has an overall configuration resembling a staircase. As shown in FIGS. 7 and 8, one end of the cam groove 37d (or 38d) is in alignment with one end of the guide groove (second guide groove) 16e formed in the chassis 16.

As will be apparent from the foregoing description, the moving member 18 (or the movable chassis B 20 which is one component of said member) is supported at three points with respect to the supporting chassis 16 by means of the pin 20c and the moving plates 37 and 38. As is clear from FIG. 10, one of these support points (i.e., the position of pin 20c) is disposed in the vicinity of the junction between the tray guide groove 30a in the tray guide member 30 and the tray guide on the moving member 18 (as composed of the arched guide face 19a on the movable chasis A 19 and the arched guide projection 20a on the movable chassis B 20).

The advantage of disposing one of the three support points for the moving member 18 at the position described above is that the position of the tray guide on the moving member 18 can be determined with high precision with respect to the tray guide groove 30a, thereby ensuring smooth and precise transport of disks.

As shown in FIGS. 6 and 9, the left-hand moving plate 37 is provided at the right front end with a rack 37h that extends in the direction in which said moving plate extends. This rack 37h meshes with the small gear wheel 40a on a double gear 40 that is provided on the planar portion 16a of the chassis 16. The large gear wheel 40b on the double gear 40 is coupled to the output shaft of a motor 45 by means of a gear wheel 41, a pulley 42 that is integral with said gear wheel 41, a belt 43 and a small pulley 44. Between the left-hand moving plate 37 and the right-hand moving plate 38 is provided a pivoting lever 47 that is mounted generally in the center of the planar portion 16a of the chassis 16 such that it is pivotable about a support shaft 47a extending in the vertical direction 9 both in the direction indicated by the arrow Z and in the opposite direction. The opposite ends of the lever 47 are brought into engagement with U-shaped members provided on the left- and right-hand moving plates 37 and 38.

The double gear 40 as combined with the gear wheel 41, the pulley 42, the belt 43, the small pulley 44, the motor 45, the pivoting lever 47 and associated minor peripheral members make up a means for imparting a driving force of the moving plates 37 and 38 forming the second moving member. This driving force imparting means as combined with the moving plates 37 and 38 forming the second moving member make up a means for causing the moving member 18 composed of the movable chassis A 19 and the movable chassis B 20 to move in the vertical direction (both in the direction indicated by the arrow Z and in the opposite direction).

As shown in FIG. 7, a sensor switch 49 is provided on the inner surface of the left-hand erect portion 16b of the chassis 16. This sensor switch 49 checks to see if the moving plate 37 as one component of the second moving member which is reciprocating in forward and backward directions is at its most retracted limit position (the position for the limit of the forward movement); the switch is actuated when its actuator comes into engagement with a projection 37i studded on the left-hand surface of the moving plate 37. The right-hand surface at the front end of the moving plate 37 is provided with an address plate 50 having six slits 50a aligned in the direction in which said moving plate 37 moves. At the rear of the sensor switch 49 is provided a photosensor 51 for detecting each of the slits 50a in the address plate 50. For the purpose of the following description, let the sensor switch 49 be referred to as the first sensor, and the photosensor 51 as the second sensor. A series of slit detection signals from the second sensor are fed to a counter (not shown) where they are counted. A unit (not shown) for performing automatic control of the multi-disk player is contained at a predetermined location in the housing 2 and this control unit uses the output from said counter in order to determine the position where the moving plate 37 has stopped.

The first sensor (sensor switch) 49 has combined with the address plate 50, the second sensor (photosensor) 51, the counter and the control unit make up a positioning mechanism by which the moving plate 37 is moved to a desired address position and has its location determined at that position. If a command for moving is supplied while the second sensor (photosensor) 51 is issuing slit detection signals, said positioning mechanism causes the moving plate 37 to move by a distance proportional to the difference between the present address and the desired address. If a command for moving is supplied when the photosensor 51 is issuing no slit detection signal, the positioning mechanism will cause the moving plate 37 to move to the position of the desired address after the plate has been moved (in the backward direction) to a position where a detection signal can be obtained from the first sensor (sensor switch) 49.

Figure 15:
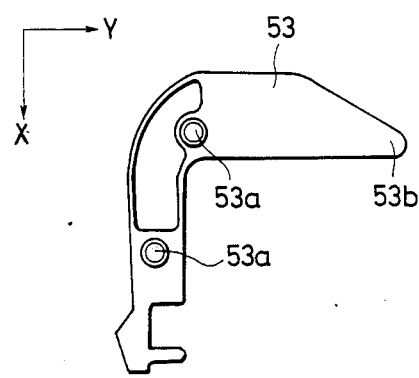

As shown in FIGS. 6 and 10, the movable chassis B 20 which is one component of the moving member 18 is provided at the upper right-hand front end with a tray projecting member 53 that engages with each one of the trays 11 and 12 within the magazine 5 so as to cause the individual trays to be projected to the outside of the magazine body 8. Details of the projecting member 53 are shown in FIG. 15. As one can see from FIG. 15, the tray projecting member 53 has a generally L-shaped overall view and is guided by means of a pair of pins 53a that are studded on the tray projecting member and which make movable engagement with two arched guide grooves, 20e and 20f, having different radii that are formed in the movable chassis B 20. the pins 53a are slightly long with respect to the guide grooves 20e and 20f so that the tray projecting member 53 has a small clearance in the direction in which the trays are stacked. Stated more specifically, the tray projecting member 53 rotates about the center of curvature of each of the arched guide grooves 20e and 20f so that the rotating end 53b of the member 53 will push the trays 11 and 12 to project from the magazine body 8. In this connection, it should be mentioned that as is clear from FIGS. 3 and 6, the imaginary axis of rotation of the tray projecting member 53 (i.e., the center of curvature of the guide groove 20e or 20f) is in agreement with the axis 8a around which each of the trays 11 and 12 will rotate. The tray 11 (or 12) is caused to project to the outside of the magazine body 8 as a result a portion 11c (or 12c) close to the axis of rotation 8a (see FIGS. 3 to 5) being pushed by the tray projecting member 53.

The tray projecting member 53 is made of a comparatively soft resin and its rotating end 53b is made flexible in the vertical direction, or in the direction in which the trays 11 and 12 are stacked. In addition, as mentioned in the previous paragraph, the tray projecting member 53 is provided with a small clearance in the vertical direction. Because of its flexibility, if part of the rotating end 53b is inserted into the tray guide channel (described hereinbefore) in the magazine body 8, it will move along this tray guide channel. In its inoperative mode, the rotating end 53b of the tray projecting member 53 engages with a Y-shaped groove 20g in the chassis B 20 and makes a limited movement in the upward direction (as indicated by the arrow Z).

The tray projecting member 53 is provided on the movable chassis B 20 which is one component of the moving member 18. Therefore, the moving member moving means (composed of the moving plates 37 and 38, etc.) as combined with the positioning mechanism including the address plate 50 make up a tray projecting member moving means that will cause both the tray projecting member 53 and the moving member 18 to move to the position where said member 53 engages with the tray (11 or 12) carrying the disk 10 to be played.

The trays 11 and 12 are caused to project from the magazine body 8 by rotating the driving the tray projecting member 53, and the means for driving the tray projecting member is described hereinafter.

Figure 16A:
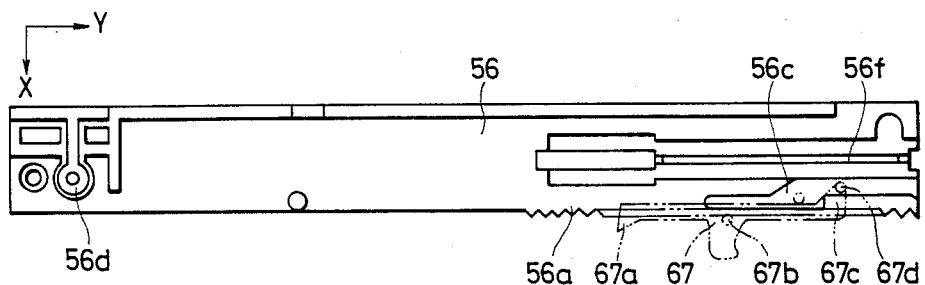
Figure 16B:
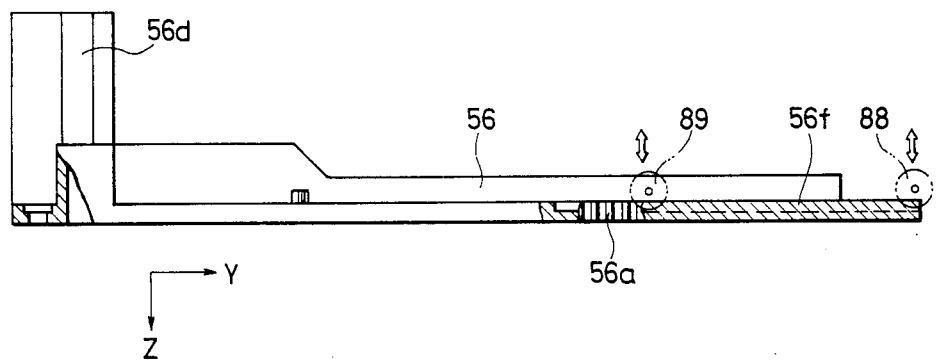

As shown in FIGS. 6, 9 and 10, a moving body 56 that extends in forward and backward directions is arranged on the right-hand side of the chassis 16 and mounted thereon in such a manner that it is freely movable in the direction in which it extends. Details of the moving body 56 are shown in FIGS. 16A and 16B. The moving body 56 is provided at the left-hand front end with a rack 56a that extends in the direction in which said moving body extends. This rack 56a meshes with the small gear wheel 57a on a double gear 57 that is provided on the planar portion 16a of the chassis 16. The large gear wheel 57b on the double gear 57 as coupled with a gear wheel 58, a pulley 59 that is integral with said gear wheel 58, a belt 60, a small pulley 61, a motor 62 and associated minor peripheral members make up a means for imparting a driving force to the moving body 56. In addition to the function to be described hereinafter, the moving body 56 performs the function of causing the magazine 5 to project to the outside of the housing 2 by means of moving forwardly in response to a magazine eject signal. A detailed mechanism behind the ability of the moving body 56 to cause the magazine 5 to project from the housing 2 is as follows: when part of said moving body 56 engages with a swinging lever 64 (see FIG. 6), the latter will swing about its supporting axis 64a in the clockwise direction with reference to FIG. 6, whereupon the swinging end of that lever comes into engagement with the rear end of the magazine 5 so as to push it out of the housing 2. It is to be noted that a spring 65 causes the swinging lever 64 to be biased in the counter clockwise direction with reference to FIG. 6.

As shown in FIGS. 6 and 10, the chassis 16 is provided in the vicinity of its right end with a locking member 67 that is rotatably mounted on a pin 67b and which will lock the magazine 5 at its loading position in the housing 2 as a result of its one rotating end 67a engaging with a recess 5a (see FIG. 3) in the magazine 5. This locking member 67 is urged by a spring member 68 so that said one rotating end 67a will be fitted into the recess 5a in the magazine 5. As shown in FIG. 16A, a pin 67d studded on the other rotating end 67c of the locking member 67 is in slidable engagement with a cam groove 56c formed at the front end of the moving body 56. In other words, the magazine 5 that has been locked by the locking mechanism composed on the locking member 67 and the spring member 68 is released from the locked state by means of movement of the moving body 56.

Figure 17:
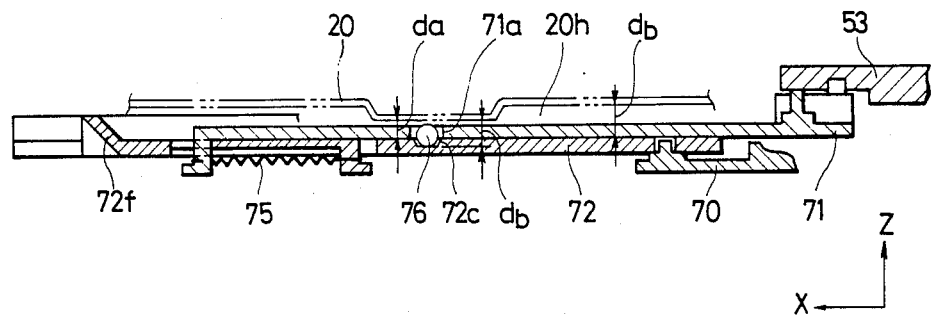
Figure 18:
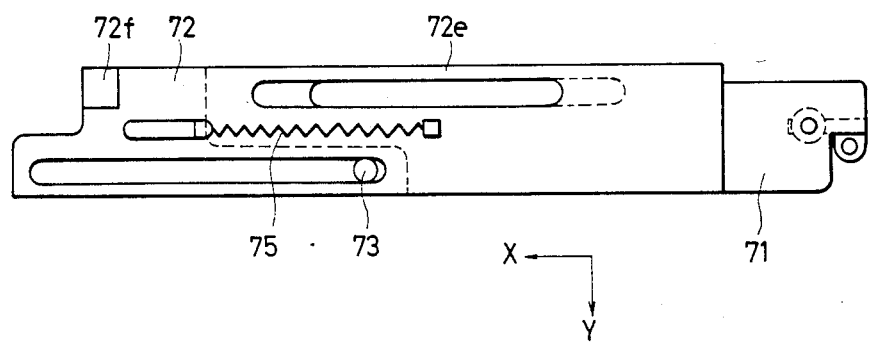
Figure 19A:
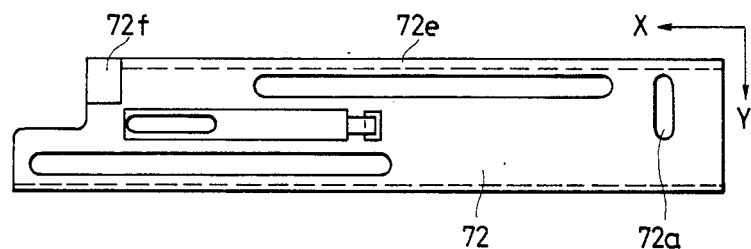
Figure 19B:
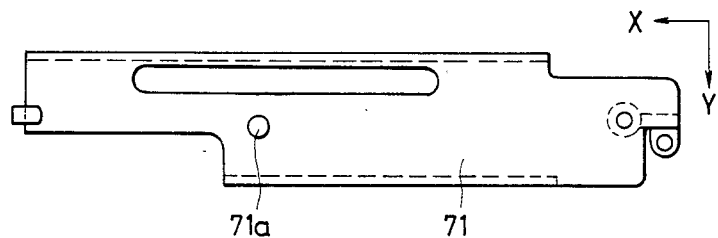

As shown in FIGS. 6, 9 and 10, the underside of the moving member 18 (or the movable chassis B 20 which is one component of said member 18) that moves in the vertical direction (both in the direction indicated by the arrow Z and in the opposite direction) is provided with an intermediate lever 70 that is pivotally mounted on a pin 70a. One pivoting end of the intermediate lever 70 is provided with a U-shaped notch 70b that is capable of smooth engagement with a cylindrical engaging portion 56d formed to extend in the vertical direction through the rear end of the moving member 56. As is also shown in FIGS. 17 and 18, the movable chassis B 20 is provided at its lower front end with a first lever member 71 and a second lever member 72 each extending in rightward and leftward directions; these levers 71 and 72 are mounted on the movable chassis B 20 by means of a plurality of pins 73 such that the levers will be capable of reciprocating in the directions in which they extend. Details of the second and first levers, 72 and 71, are shown in FIGS. 19A and 19B, respectively. A pin 70c is studded on the other pivoting end of the intermediate lever 70 and this pin is slidably fitted in a slot 70a formed at the right-hand end of the second lever member 72 to extend in forward and backward directions. Stated more specifically, if the moving body 56 reciprocates in forward and backward directions (in the direction indicated by the arrow Y and in the opposite direction), the intermediate lever 70 will rotate around the pin 70a, whereby the second lever member 72 is caused to reciprocate in left and rightward directions (in the direction indirected by the arrow X and in the opposite direction). The above-described moving body 56 as combined with the means (including the motor 62) for imparting a drive force to the moving body 56, the intermediate lever 70 and associated minor peripheral members make up a mechanism for driving the second lever member 72. It is to be mentioned that the first lever member 71 engages with the tray projecting member 53 at its right-hand end and is capable of rotating said lever member as a result of movement in the advancing direction (or movement to the right). The second lever member 72 serves to move the support (to be described hereinafter) which is one component of the clamping mechanism to be also described hereinafter.

As shown in FIGS. 10, 17 and 18, the first lever member 71 is connected to one end of a coil spring 75 that will urge said lever member in the direction of its advancement or in the rightward direction (opposite to the direction indicated by the arrow X). The coil spring 75 is incorporated in such a manner that is connects the first and second levers 71 and 72, with the other end of the spring 75 being connected to the second lever member 72.

As shown in FIG. 17, the underside of the movable chassis B 20 is provided with a first recess 20h extending in leftward and rightward directions (both in the direction indicated by the arrow X and in the opposite direction), and the upper surface of the second lever member 72 is provided with a second recess 72c that is capable of maintaining a face-to-face relationship or alignment with said first recess 20h. The first lever member 71 which is so positioned as to be sandwiched between the movable chassis B 20 and the second lever member 72 is provided with an opening 71a that is capable of maintaining a face-to-face relationship with these first and second recesses 20h and 72c. The opening 71a contains a spherical movable slider 76 that is capable of engaging with the first recess 20h and the second recess 72c. The dimension indicated by da in FIG. 17, or the distance between the opposing faces of the movable chassis B 20 and the second lever member 72 within the limits of their relative movement, is smaller than the outside dimension of the movable slider 76. The dimension indicated by db in FIG. 17, or the distance by which any one of the opposing surfaces of the movable chassis B 20 and the second lever member 72 is spaced from the bottom surface of either one of the first recess 20h and the second recess 72c which is in a face-to-face relationship with any one of said opposing surfaces, is slightly larger than the outside dimension of the movable slider 76.

The first and second recesses, 20h and 72c, as combined with the opening 71a, the movable slider 76 and associated minor members make up a lock/unlock means that locks the first and second lever members 71 and 72 and which, when the locked lever members advance in the rightward direction (opposite the direction indicated by the arrow X) until the first lever member 71 has reached an area in the vicinity of its most advanced position (i.e., the position where the tray projecting member 53 has caused the trays 11 and 12 to project fully from the magazine body 8), unlocks said lever members 71 and 72. After being unlocked from the second lever member 72, the first lever member 71 will make a slight movement toward its most advanced position by means of the urging force exerted by the aforementioned coil spring 75. In addition, while the first lever member 71 is making said slight movement, the arched portions 11d and 12d of the trays 11 and 12 (see FIGS. 4 and 5) contact an arched contact portion 19c formed on the movable chassis A 19 (see FIGS. 6 and 10), whereby the disk 10 carried on each of these trays is positioned concentrically with, or right under, the disk-carrying surface 23a (see FIG. 11B) of the turntable 23.

The lock/unlock means (composed of the movable slider 76 and associated members) as combined with the first and second lever members 71 and 72, the coil spring 75 as the urging means, and the second lever member 72 driving mechanism including the moving body 56 and the motor 62 (as already described) make up a tray projecting member drive means that rotates and drives the tray projecting member 53 so as to cause the trays 11 and 12 to project from the magazine body 8.

Said tray projecting member drive means as combined with the chassis 16 (i.e., supporting member), the moving member 18 (i.e., the first moving member composed of the movable chassis A 19 and the movable chassis B 20), the tray projecting member 53 and the tray projecting member moving means composed of the moving plates 37, 38, etc. make up a tray projecting means that causes the tray 11 or 12 carrying the desired disk 10 to project from the magazine body 8.

As shown in FIG. 10, the lower left-hand side of the moving member 18 (or the movable chassis B 20 which is one component of said member) is provided with a support 79 that extends in both leftward and rightward directions (the direction indicated by the arrow X and the opposite direction) and which is mounted on the movable chassis B 20 such that it is capable of swinging about a pin 79a provided at its left end. Since the pin 79a extends in forward and backward directions (both in the direction indicated by the arrow Y and in the opposite direction), the support 79 will swing in a plane perpendicular to the disk-carrying surface 23a of the turntable 23 (see FIG. 11B). The free end of the support 79 is rotatably provided with a disk-shaped depressing member 80 that makes contact with the side of the disk 10 which is opposite the side facing the turntable 23 so as to clamp the disk in cooperation with said turntable. The support 79 is also provided with a coil spring (not shown) that urges said support in such a direction that the depressing member 80 will approach the disk-carrying surface 23a of the turntable 23.

The above-described support 79, depression member 80 and associated members make up a clamp mechanism for clamping the disk.

As shown in FIG. 10, a forwardly extending pin 79c is studded on the free end of the support 79 and this pin engages with a planar guide portion 72e at the upper rear edge of the second lever member 72. A tapered portion 72f that is capable of engaging with the pin 79c on the support 79 is formed at a position that is on an extension of the planar guide portion 72e and which is at the left end of the second lever member 72. As is evident from FIG. 17, the tapered portion 72f is inclined both in the left direction (indicated by the arrow X) and in the upward direction (indicated by the arrow Z). Because of this arrangement, as the second lever member 72 advances in the rightward direction (indicated by the arrow X), the pin 79c on the support 79 slides on the planar guide portion 72e and, at the same time, the depressing member 80 is held in its unclamped position 72f so as to cause the depressing member 80 to move to the clamped position.

The aforementioned clamp mechanism as combined with the second lever member 72 and the second lever member drive mechanism described above make up a disk moving means by which the disk 10 carried on the tray 11 or 12 as a result of being projected to the outside of the magazine body 8 by means of the above-described tray projecting means is moved in a direction perpendicular to the disk-carrying surface 23a (see FIG. 11B) of the turntable 23. This disk moving means as combined with the tray-projecting means described above make up a disk pickup and transport mechanism by which a desired disk 10 is selected from the magazine 5 and transported on to the disk-carrying surface 23a of the turntable 23. It should be mentioned that both the second lever member 72 and the second lever member driving mechanism are common to the tray projecting means and the disk moving means.

As shown in FIGS. 6, 9 and 10, a tabular disk holding member 83 is disposed such that it is sandwiched between the movable chassis A 19 and the movable chassis B 20 which are the two components of the moving member 18. This holding member 83 is mounted on the movable chassis A 19 by means of a plurality of pins 83a that are in movable engagement with a cam groove 19e, FIG. 9, formed in that movable chassis A. As is also shown in FIG. 11B, the cam groove 19e is typically formed such that it is inclined both in the leftward direction (indicated by the arrow X) and in the upward direction (indicated by the arrow Z). In other words, the cam groove 19e is formed such that when the disk holding member 83 moves leftward (or rightward), it simultaneously moves upward (or downward). As is clear from FIGS. 9 and 10, the underside of the right rear end of the disk holding member 83 is provided with a projection 83b that extends downwardly, and if the right edge of this projection 83b is pushed by one end 70e (see FIG. 10) of the pivoting intermediate lever 70, the disk holding member 83 is caused to move leftward (in the direction indicated by the arrow X). It is to be noted that the disk holding member 83 is biased in the rightward direction (opposite to the direction indicated by the arrow X) typically by means the coil spring 84 shown in FIG. 9.

As already mentioned, the disk is moved by the disk moving means in the vertical direction perpendicular to the disk-carrying surface 23a (see FIG. 11B) of the turntable 23, and the function of the disk holding member 83 is to keep that disk parallel to said disk-carrying surface by means of the underside of said holding member which contacts the side of the disk facing said disk-carrying surface.

Turning back to FIGS. 6 and 8, a pair of sensor switches 86 and 87, the latter being positioned behind the former, are mounted on the inner surface (the left surface) of the right-hand erect portion 16c which is one component of the chassis 16. These switches will detect the position to which the moving body 56 has been driven by the motor 62. As is evident from FIG. 8, the sensor switches 86 and 87 are provided with actuators 86a and 87a, respectively, which project obliquely with respect to the switch bodies and are capable of swinging. A pair of rollers 88 and 89 which are movable only in the vertical direction with respect to the chassis 16 (i.e., in the direction indicated by the arrow Z and in the opposite direction) are engagement with these actuators 86a and 87a at their free end. As shown in FIGS. 16A and 16B, each of the rollers 88 and 89 is in engagement with a projection 56f that has a trapezoidal cross section and which is formed on the underside of the front end of the moving body 56 in such a manner that it extends in forward and backward directions. If the moving body 56 moves a predetermined distance in either forward or backward direction, each of the rollers 88 and 89 is caused to move either upwardly or downwardly depending on the case by means of the action of the projection 56f, whereupon the corresponding sensor switch 86 or 87 is actuated. It should be mentioned that the rollers 88 and 89 are caused to move upwardly by the biasing force exerted on the respective actuators 86a and 87a by the bias imparting means provided within the sensor switches 86 and 87.

Detection signals issued from the sensor switches, 34, 35, 49, 86 and 87, and from the photosensor 51 are transmitted to the control unit (already described but not shown), and in response to the operation signals that are sent from the control unit in response to said detection signals, the motors 27, 45 and 62, and the turntable 23 are operated at the predetermined timings which will be described hereinafter.

Figure 20:
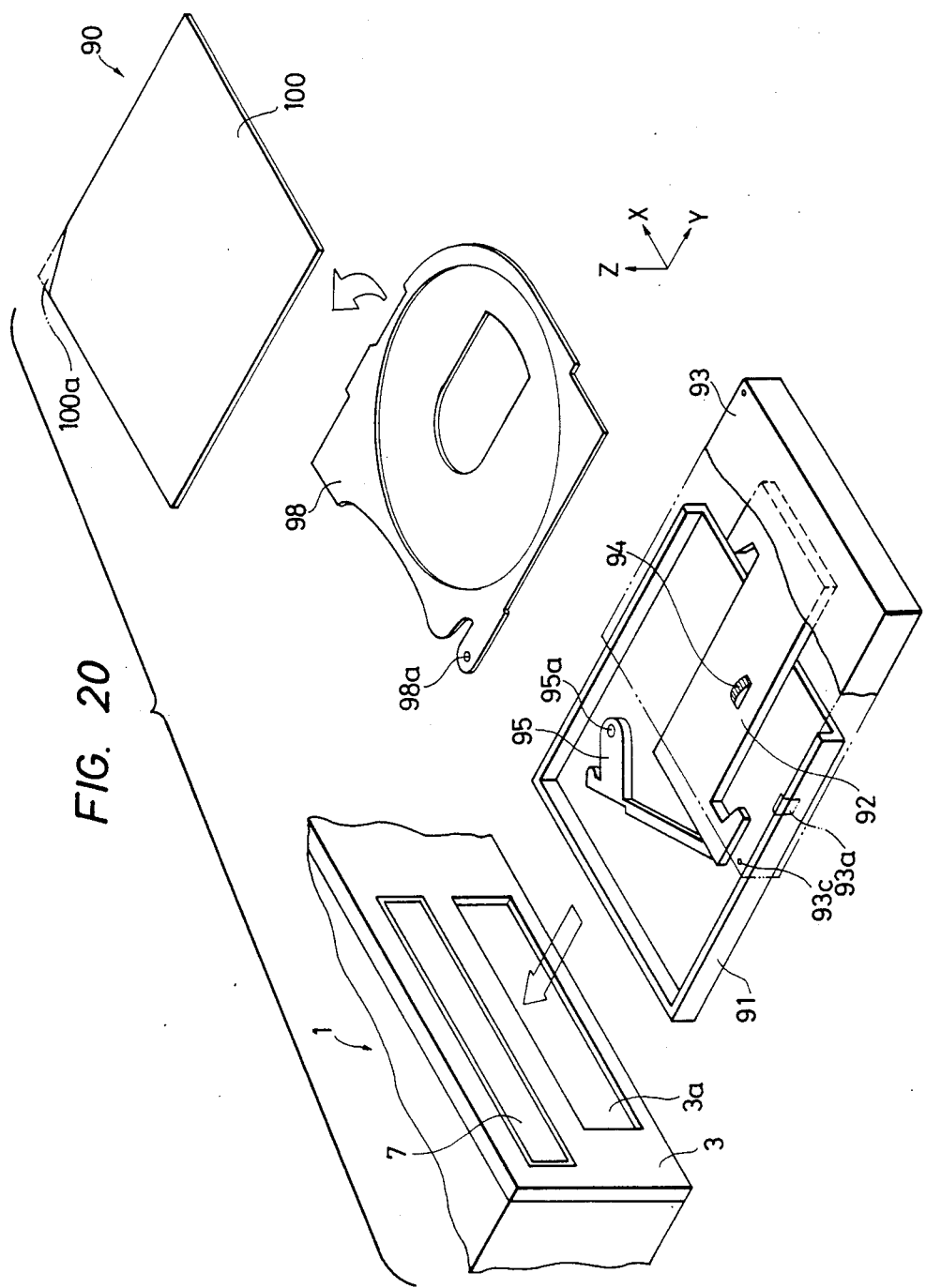
FIGS. 20 and 21 are illustrations of a single adapter that may be used with the multi-disk player of the present invention.
Figure 21:
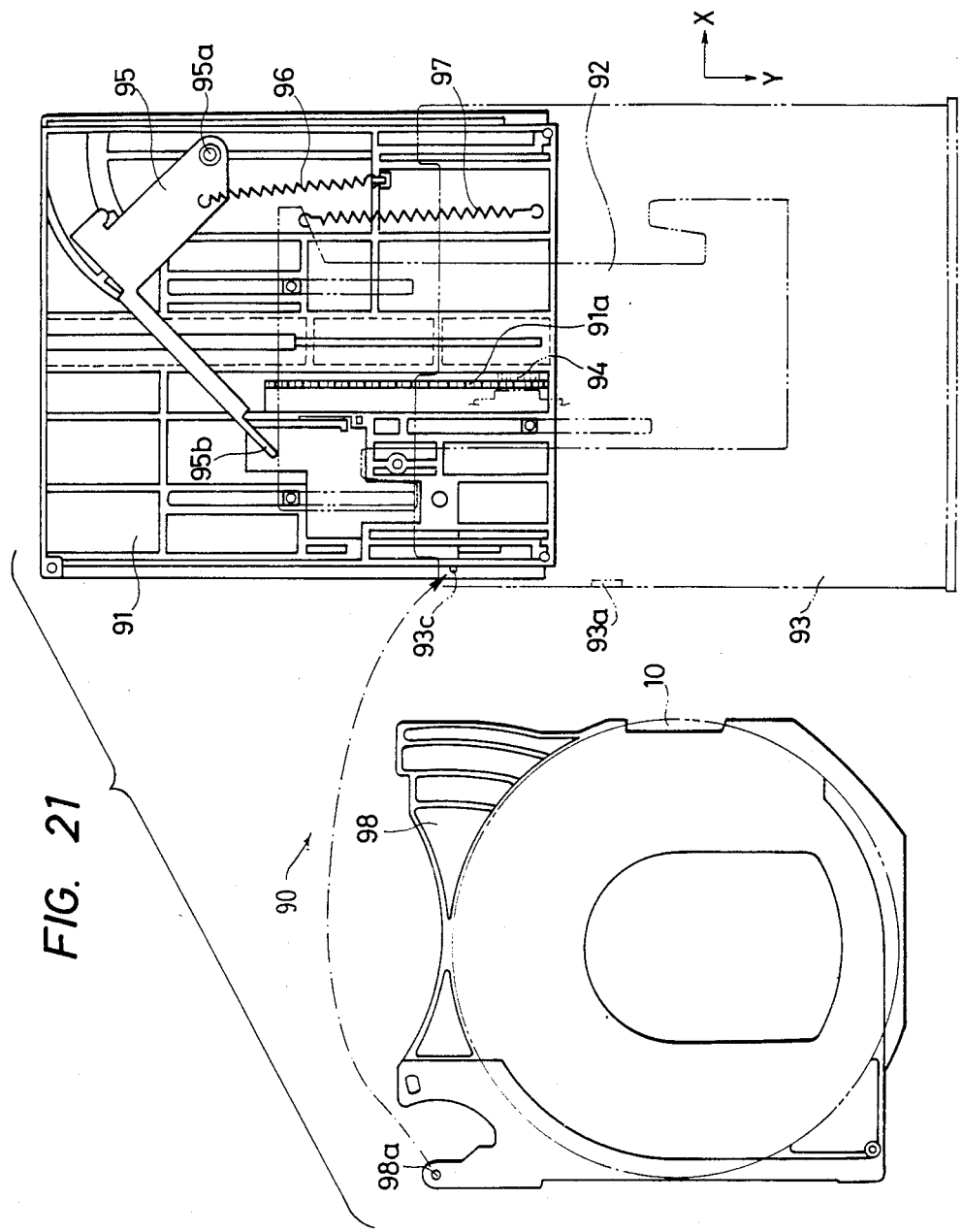

FIGS. 20 and 21 illustrate a single adapter 90 that is detachably loaded into the magazine loading area in the multi-disk player 1 and which is capable of accommodating a single disk 10 (see FIG. 3) in a replaceable manner. As shown, the single adapter 90 has a first member 91, a second member 92 and a third member 93 that are capable of relative movements within predetermined limits in predetermined directions which, in the embodiment shown, refer to the forward and backward directions (the direction indicated by the arrow Y and the opposite direction). A gear wheel 94 is provided in generally the center of the second member 92, and this gear wheel meshes with a rack 91a formed in the first member 91 in such a manner that it extends in forward and backward directions. The third member 93 is also provided with a rack (not shown) that faces the rack 91a in the first member 91 and which meshes with the gear wheel 94. The first member 91 is provided at its rear end with a lever member 95 that is swingable on a pin 95a, and this lever member 95 is urged by a coil spring 96 such that its free end 95b is pressed against the rear end face of the second member 92. The second member 92 is also urged by another coil spring 97 in forward direction (indicated by the arrow Y). In other words, the coil springs 96 and 97 combine with the lever member 95 to cause the second member 92 to project forwardly with respect to the first member 91, and consequently, the gear wheel 94 combines with the rack 91a and other associated components to cause the third member 93 to project forwardly. It should be noted here that the rate of projection of the third member 93 is double that of the second member 92. As shown in FIG. 21, the third member 93 is provided at its right end with an engaging recess 93a that may be locked by the locking member 67 shown in FIG. 10; the position in which this recess 93a is formed is the same as in the case of the magazine 5.

An upwardly extending pin 93c is studded on top of the right gear end of the third member 93, and a tabular tray C 98 for carrying the disk 10 is swingably mounted on that pin 93c which is inserted through a pin hole 98a. The shape of the tray C 98 is generally the same as that of the tray A 11 shown in FIG. 4 and is caused to project from the body of the single adapter 90 by the tray projecting member 53 shown in FIG. 10 and other drawings. It should be noted that top of the third member 93 is provided with a cover member 100 that serves to cover the tray C 98.

The sensor switches 34 and 35 shown in FIG. 10 which serve to detect the loading of the magazine 5 within the player may also be used to detect the loading of the single adapter 90 within the player. However, as shown in FIG. 20, a portion 100a of the cover member 100 that is to engage with the other swinging end 32b of the push lever 32 (see FIG. 14) for actuating the sensor switch 35 is cut off so that the push lever 32 will not swing and, hence, that the switch 35 will not be actuated. Because of this arrangement, only the sensor switch 34 is actuated as a result of the push lever 33 being brought into engagement with the corner at the left rear end of the first member 91, and this event is recognized by the control unit (already described) as being equivalent to completion of the loading of the single adapter 90.

Although not shown, the single adapter 90 is provided with a mechanism for locking the third and second members, 93 and 92, to the first member 91 when said single adapter is not loaded within the player. The members 93 and 92 are unlocked when the single adapter 90 has been loaded within the player.

Figure 22:
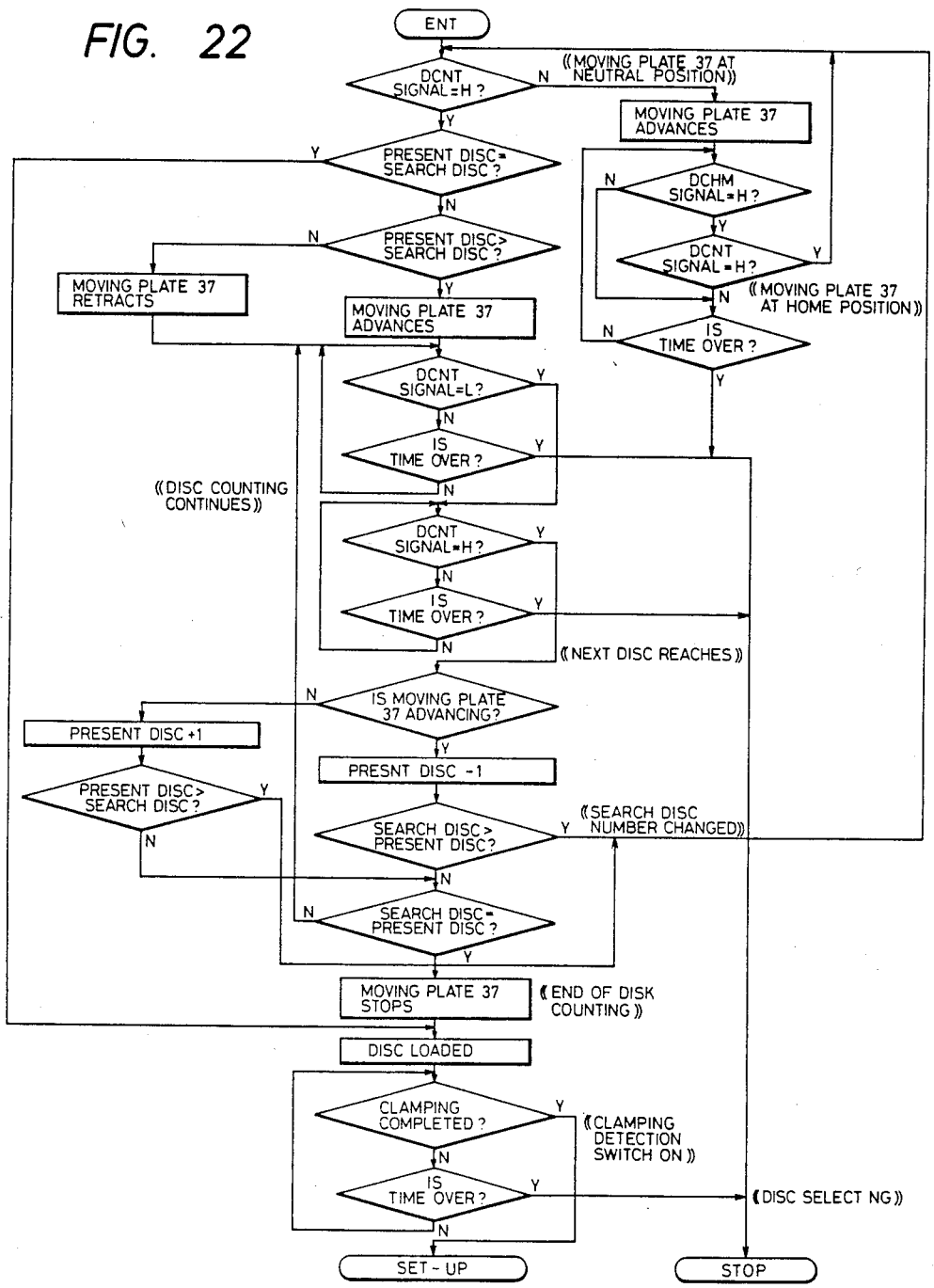
FIGS. 22 and 23 are illustrations of the sequence in which the multi-disk player of the present invention is operated.
Figure 23:
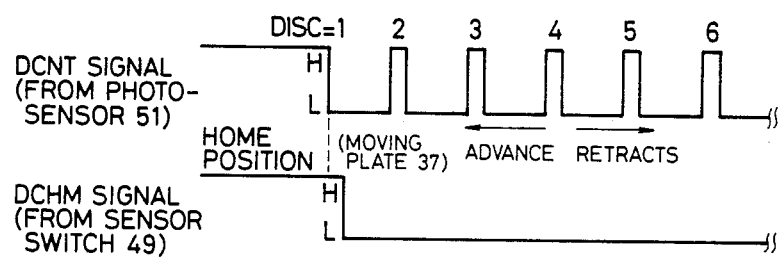

The operation of the multi-disk player having the construction described above is hereunder described briefly in accordance with the sequence of playing steps with reference to FIGS. 1 to 21 taken in conjunction with FIGS. 22 and 23.

When the disk to be played is selected by pushing one or more of the buttons shown in FIG. 1, a drive voltage is applied to the motor 45 and the moving plates 37 and 38 start to move either forwardly (in the direction indicated by the arrow Y) or backwardly (in the direction opposite to that indicated by the arrow Y). Then, as a result of the action of the cam grooves 37d and 38d formed in the shape of a staircase in the moving plates 37 and 38 as combined with the action of the guide grooves 16e formed in the chassis 16, the pins 20c movably fitted in the respective grooves are caused to move upwardly or downwardly, whereupon the moving member 13 including the movable chassis B 20 on which the pins 20c are studded are allowed to move either upwardly or downwardly. As a consequence, the tray projecting member 53 provided on the movable member 18 reaches the position where it engages with the tray 11 or 12 carrying the disk to be played.

Detailed mechanisms for the forward and backward movements of the moving plate 37 and its positioning and, hence, the upward and downward movements of the tray projecting member 53 and its positioning, are described hereinafter.

The "DCNT" signals shown in FIGS. 21 and 23 refer to the slit detection signals issued from the photosensor 51, and the "DCHM" signals refer to the detection signals issued from the sensor switch 49 for checking to see of the moving plate 37 is at its most retracted position (the position for the limit of the forward movement), or in the home position. As shown in FIG. 22, if a command signal is on while the photosensor 51 is issuing a DCNT signal, the moving plate 37 is moved by the distance corresponding to the difference between the present adderess (present DISC) and the desired address (search DISC). If, on the other hand, a command signal is on while no DCNT signal is being issued from the photosensor 51, the moving plate 37 continues to be retracted (moved forwardly) until a DCHM signal is issued from the sensor switch 49, and thereafter the plate is moved to the position of the desired address (search DISC).

When the tray projecting member 53 is brought to the position where, by the procedures described above, it engages with the tray carrying the disk to be played, the motor 62 then starts to rotate to drive the moving body 56 in the backward direction (opposite to the direction indicated by the arrow Y). As a result, the intermediate lever 70 is caused to pivot in the counter-clockwise direction with reference to FIG. 10 and the second lever member 72 connected to said intermediate lever is caused to move rightward (in the direction opposite to the indirected by the arrow X). As shown in FIG. 17, the second lever member 72 is locked to the first lever member 71 by means of the lock/unlock mechanism including the movable slider 76. Consequently, both the first lever member 71 and the second lever member 72 are caused to move rightward, causing the tray projecting member 53 to pivot in the clockwise direction with reference to FIG. 10. Therefore, as shown in FIG. 3, the tray (e.g., tray B 12) carrying the disk to be plated is caused to project from the magazine body 8 and the disk is caused to move to a position which is concentric with, namely, right under, the disk-carrying surface 23a of the turntable 23. It should be noted that immediately before the pivoting of the tray projecting member 53 and, hence, the rightward movement of the first lever member 71, is completed, the first lever member 71 is unlocked from the second lever member 72, and subsequent slight movement of the first lever member 71 in the rightward direction is effected by the urging force of the coil spring 75 and the arched portion 12d of the tray B 12 (see FIG. 3) that is being pressed by said urging force is brought into contact with the predetermined arched contact portion of the movable chassis A 19. These procedures will complete the positioning of the tray B 12. The fact that the tray has been projected from the magazine body 8 is detected by sensing a detection signal issuing from the sensor switch 87 (see FIG. 8 and other drawings) that is actuated by the movement of the moving body 56.

The second lever member 72 that has been unlocked from the first lever member 71 is further driven in the rightward direction (opposite to the direction indicated by the arrow X), and the support 79 that is in engagement with the tapered portion 72f of the second lever member by means of the pin 79c is caused to swing upwardly (in the direction indicated by the arrow Z). As a result, the disk is lifted and clamped to the turntable 23. This upward movement of the disk is shown by "DISC load" in FIG. 22. Simultaneously with this upward movement of the disk, the intermediate lever 70 pivots to lift the disk holding member 83 together with the disk. It should be mentioned that at the time when the loading of the disk on to the turntable has been completed, the disk holding member 83 slightly disengaged from the disk and will not prevent continued revolution of the disk.

The above procedures render the system ready for play and the turntable 23 and the carriage 24 (see FIG. 9 and other drawings) are operated to start the playing of the desired disk.

When the playing of the desired disk ends, the disk is reloaded into the magazine body 8. This may be done by reversing the above-described disk loading sequence and, therefore, it will not be necessary to describe the re-loading sequence in detail. The procedures described in the preceding paragraphs may be repeated as many times as the number of the pieces of music the listener wants to play.

The magazine 5 is ejected from the player by depressing the "EJECT" button in the group of control buttons 6. When the "EJECT" button is depressed, the moving body 56 (see for example, FIG. 16) is caused to move forward (in the direction indicated by the arrow Y) by a predetermined distance, whereupon the magazine 5 is released from the state of being locked by the locking member 67. Thereafter, the moving body 56 is caused to move further in the forward direction, whereby the swinging lever 64 shown in FIG. 6 is caused to swing about the support axis 64a and the magazine 5 engaging with the free end of that lever is pushed out of the player.

The single adapter 90 may be used in the same way as the magazine 5 after it is inserted into the housing 2 through the opening 3a. When the adapter 90 is loaded, a locking mechanism (not shown) that will lock the second member 92 to the first member 91 is released. If the single adapter is pushed further toward the retracted position against the urging force exerted by the coil springs 96 and 97, the locking member 67 will come into engagement with the recess 93a formed on the third member 93.

When a play mode is commanded, the tray C 98 is pivoted as in the case of the magazine 5, thereby allowing the disk to be played. If the listener wants to replace the disk, the "EJECT" button which is the same as what is selected when using the magazine is depressed. This causes the tray C 98 to pivot in the opposite direction as in the case of the magazine 5 and, subsequently, the locking member 67 is disengaged from the recess 93a. Then, the third member 93, being urged by the coil springs 96 and 97, will project in the forward direction (indicated by the arrow Y) until the tray C 98 is completely exposed in the outside of the adapter. The listener may then replace the disk on the tray with a desired one and push the third member 93 into the adapter, thereby completing the procedures of disk replacement without the need for another removal of the single adapter 90. If desired, the projecting third member 93 may be withdrawn to remove the single adapter 90 for replacement with the magazine 5.

As described in detail in the foregoing pages, the multi-disk player of the present invention incorporates a magazine loading detector that checks to see if the magazine (5) accommodating a plurality of disks (10) in an orderly manner has been properly loaded into the player housing (2), and this detect or is comprised of a pair of push levers (32, 33) that are spaced apart from each other by the distance corresponding to the thick portion of said magazine and which are positioned in the deepest magazine loading area as they are in engagement with the magazine, and a pair of sensor switches (34, 35) that are capable of engaging with said push levers. This arrangement permits the use of a single adapter (90) that accommodates a single disk and whose dimensions are generally the same as those of the magazine (5). Stated more specifically, all of the push levers and sensor switches are used to detect the loading of the magazine, while either one push lever (say, push lever 33) and one sensor switch (say, switch 34) are used for the purpose of detecting the loading of the single adapter. This ability of the multi-disk player of the present invention to use a single adapter enables individual disks of interest to be loaded into the player within a very short time, while providing great ease in disk replacement and good operability of the player.

More detailed explanation of the multi-disk container which is applicable to the foregoing apparatus will be described with reference to 24 to 29.

Figure 24:
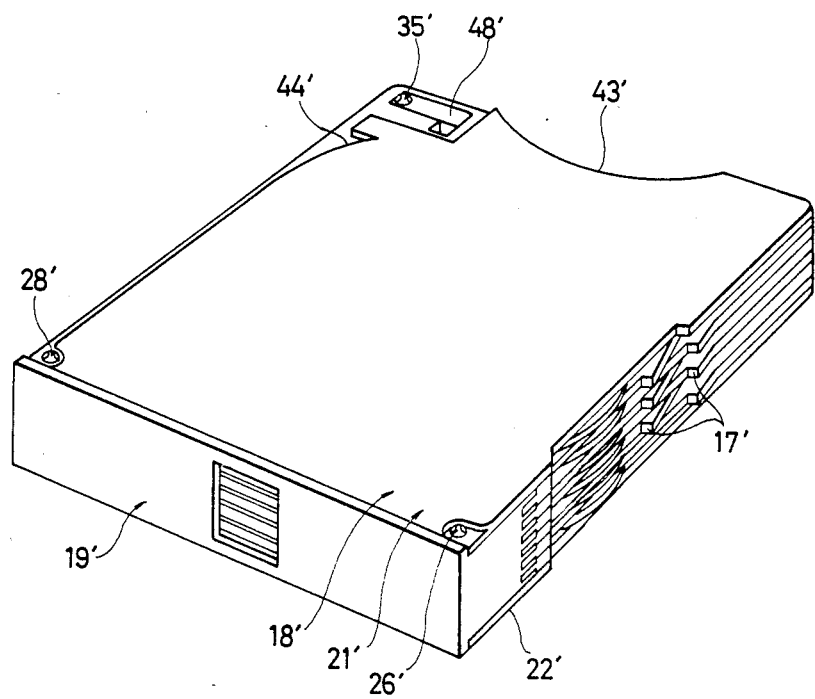
FIG. 24 is a perspective view of the disk container of the present invention as seen from its front portion.
Figure 25:
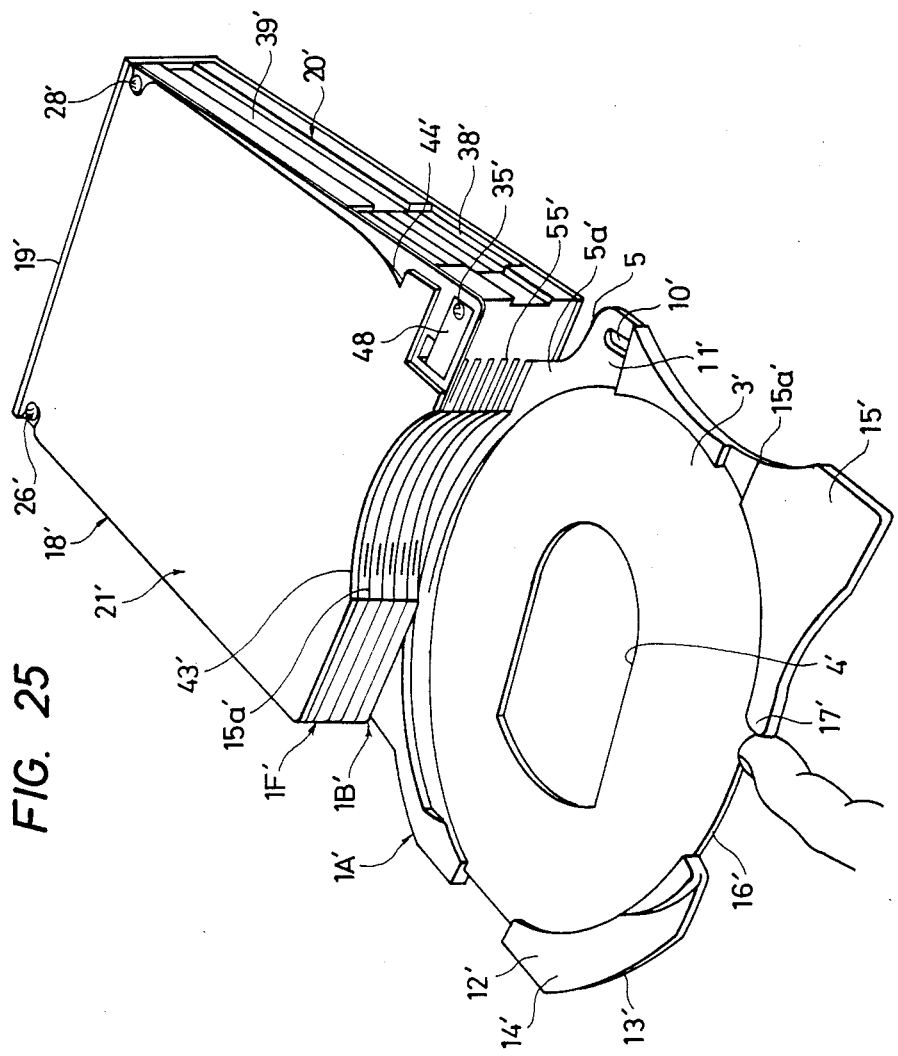
FIG. 25 is a perspective view of the same container as seen from its rear portion, with a tray withdrawn from the container.
Figure 26:
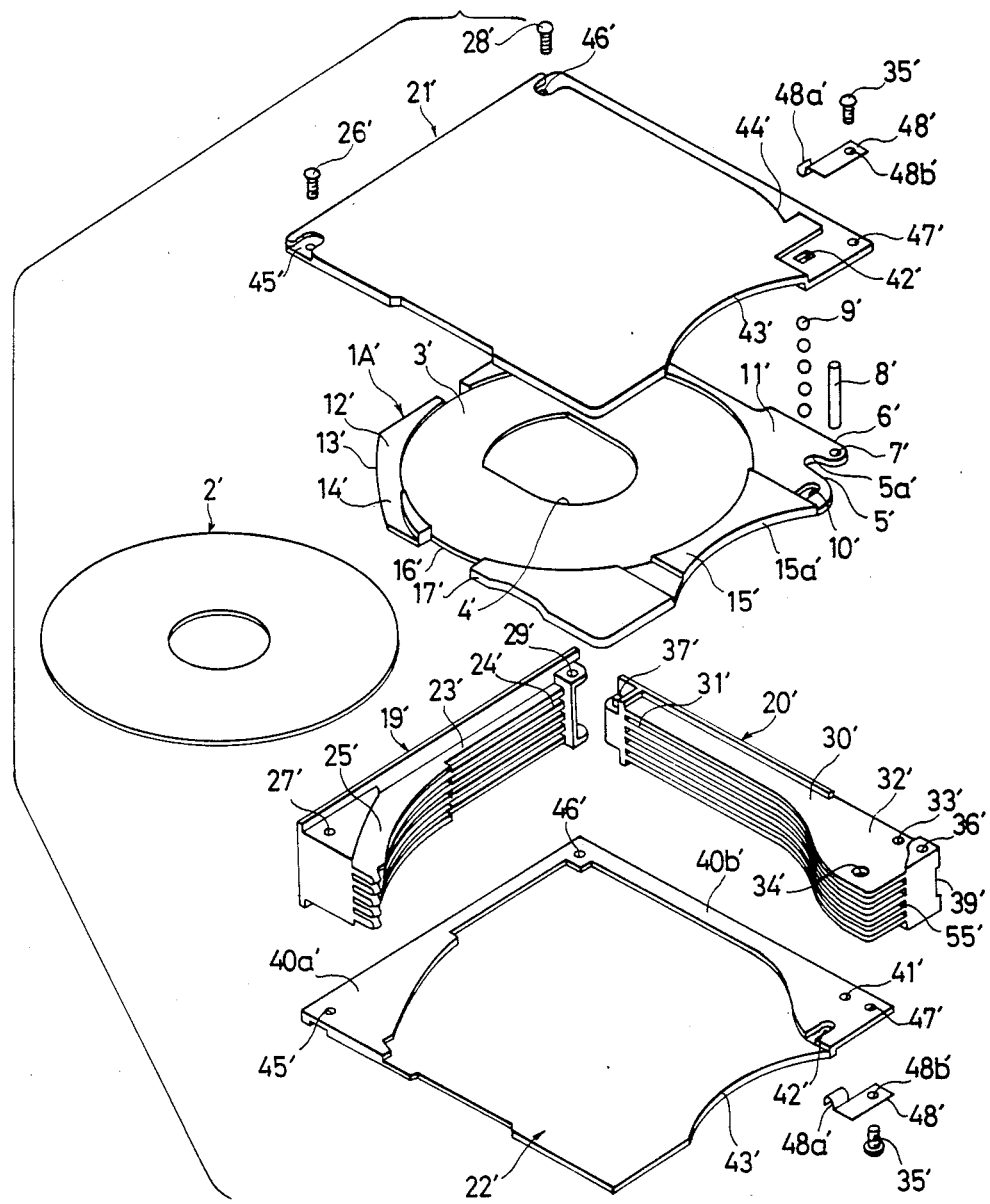
FIG. 26 is a perspective view of the unassembled parts of the same container.
Figure 27:
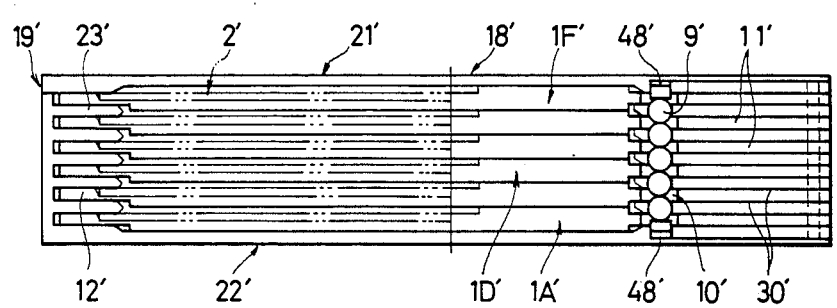
FIGS. 27 and 28 illustrate the action of the mechanism of the same disk container.
Figure 28:
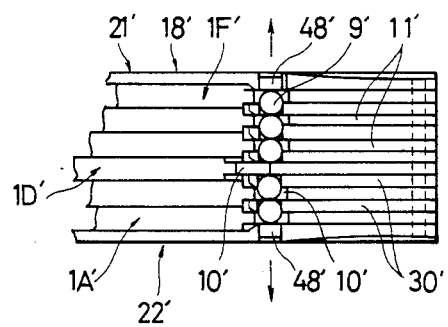

FIG. 24 is a perspective view of the disk container of the present invention as seen from the front thereof. FIG. 25 is a perspective view of the same container as seen from the rear, with a tray withdrawn from the container. FIG. 26 is a perspective view of the unassembled parts of the same container. FIGS. 27 and 28 illustrate the action of the mechanism of the same disk container. FIG. 29 is a plan view showing the operation of the same disk container when it is employed with an automatic player.

In each of FIGS. 24 to 29, six trays 1A', 1B', 1C' . . . 1F' are shown but since they are identical in construction, the following description refers only to the tray 1A' except where there is a particular need to describe other trays.

The tray 1A' has in its center a shallow circular recess 3' for receiving a disk 2' having a diameter substantially equal to that of the disk 2'. The recess 3' has a central opening 4' through which a spindle motor or a clamper is inserted when the disk is being played. The left corner at the rear end of the tray 1A' is provided with a projection 6' formed by a U-shaped groove 5' that is open at the rear edge of the tray. The projection 6' is provided with a shaft hole 7' through which a pin 8' is inserted to provide the axis around which the tray 1A' will rotate. A slot 10' for receiving steel balls 9' is made in that area of the tray which is opposite the projection 6' across the groove 5'. The peripheral portion 11' with the shaft hole 7' and the slot 10' is designed to have a height substantially equal to that of the top surface of the disk 2' as it is placed in the recess 3. The diameter of the steel ball 9' is set to a value equal to the distance between adjacent partitions 30' (to be described hereinafter).

A guide member 12' is provided on the side of the tray 1A' which is diagonally opposite the shaft hole 7' or at the right corner of the front portion of the tray. The contour of the edge of guide 12' is in the formed of an arc 13' which forms part of the circle having the shaft hole 7' at its center. The height of the upper surface 14' of the guide member 12' is limited so as not to exceed a level substantially equal to the height of the upper surface of the disk 2' as it is placed in the recess 3'. The tray 1A' is also provided with a thicker portion 15' on both the lateral and rear sides, the gauge of this thicker portion being substantially equal to the pitch between individual trays. The rear edge of the thicker portion 15' on the rear side of the tray 1A' is trimmed to form an arc 15a' that corresponds to the periphery of the disk 2'.

The right side of the tray 1A' is provided with a cutout 16' such that when the disk 2' is placed in the recess 3', part of its periphery will extend beyond the cutout 16'. The cutout 16' is provided with a projection 17' that assists the user to withdraw the tray 1A' from the magazine using a finger. While all the trays, 1A' to 1F, are provided with the projection 17', the projection formed in one tray is slightly staggered in position with respect to the projection in the underlying tray in either the forward or backward direction. The distance between the shaft hole 7' and the contact 17' also differs between two adjacent trays in a stack.

The trays 1A' to 1F' are movably contained within a magazine 18' which is composed of a front magazine element 19', a left-hand magazine element 20', a top plate 21' and a bottom plate 22'.

The front magazine element 19' is provided with a plurality of partitions 23' that define grooves 24' into which the trays 1A' to 1F' are to be inserted. The partitions 23' are tapered toward the left side in order to assist in the insertion of the trays 1A' to 1F'. The partitions 23' are formed in an arched shape 25' on the right-hand side. The right end of the magazine element 19' is provided with a female thread 27' that is to engage with a male screw 26', and the left end of the element 19' is provided with a small hole 29' into which a screw 28' is inserted.

Like the front magazine element 19', the lefthand magazine element 20' is provided with a plurality of partitions 30' that define grooves 31'. The partitions 30' are formed in an arched shape 32' on the rear side. In this arched area 32', a shaft hole 33' through which the pin 8' is inserted and a hole 34' for receiving steel balls 9' are formed through all the partitions 30'. The rear end of the magazine element 20' is provided with a female thread 36' that is to engage with a screw 35', and a female thread 37' that is to engage with the screw 28' is formed at the front end of the element 20'. The outer surface of the magazine element 20' is provided with an opening 38' and a guide groove 39' that assists in automatic driving of the trays 1A' to 1F'.

The opposing surfaces of the top plate 21' and the bottom plate 22' are provided with elevations 40a' and 40b' in the areas corresponding to the front magazine element 19' and the left-hand magazine element 20'. The elevations 40a' and 40b' formed on the top plate 21' serve to define a slot for accommodating the tray 1F' while the elevations 40a' and 40b' formed on the bottom plate 22' define a slot for accommodating the tray 1F' when the two plates are assembled with the front and left-hand magazine elements 19' and 20'. Each of the top plate 21' and bottom plate 22' is provided both with a hole or recess 41' into which the pin 8' is inserted and with a slot 42'. The hole or recess 41' is formed at the position corresponding to the shaft hole 33' formed in the left-hand magazine element 20', and the slot 42' is formed in the position corresponding to the hole 34' in the element 20'.

Each of the plates 21' and 22' is partly concaved on the rear edge 43' in a shape that conforms to the periphery of the disk 2' carried on each of the trays 1A' to 1F' when one of them is withdrawn from the magazine 18' as described hereinafter. The surface of each of the plates 21' and 22' is provided on the left side with a locking member 44' that locks the magazine 18' during automatic playing.

Small holes 45' and 46' into which the screws 26' and 28' are to be inserted are formed at opposite ends of the front portion of each of the top plate 21' and the bottom plate 22', while a small hole 47' into which the screw 35' is to be inserted is formed at the leftmost end of the rear portion of each plate.

A leaf spring 48' has at its tip a contact 48a' that can be freely inserted into the slot 42'. The rear end of the spring 48' is provided with a small hole 48b' into which the screw 35' is to be inserted.

The embodiment shown in FIG. 29 is hereunder described.

Although not shown, the chassis encasing the player is provided with a mechanism for locking the magazine locking member 44, and with a guide 49'. The lateral side of this guide 49' is provided with a plurality of slots 50' corresponding to the grooves 25' and 31' formed in the magazine elements 19' and 20', respectively.

The subchassis (not shown) is provided with a guide 51' that is continuous with the guide 49', a drive plate 52', and a stopper 53' for causing each of the withdrawn trays 1A' to 1F' to stop at a predetermined position. The guide 51' is provided with a single guide slot 54' corresponding to the grooves 25' and 31'. Each of the slots 50' and 54' has the same curvature as that of the arched surface 13' of the guide member 12' for the trays 1A' to 1F'. By means of a mechanism not shown, the subchassis is vertically driven stepwise to a position in alignment with any one of the trays 1A' to 1F' within the magazine 18'.

The drive plate 52' is designed to be rotatable with a drive motor not shown and has arms 52a' and 52b' at opposite ends, with the art 52a' serving to push each of the trays 1A' to 1F' out of the magazine 18' and the arm 52b for pushing the tray into the magazine 18'.

Although not shown, the subchassis is also provided with a spindle motor having a turntable, a clamper for pressing the turntable against the disk 2', and a pickup for reading the information recorded on the disk 2'.

The action of mechanism of the embodiments shown hereinabove is described below.

First of all, the magazine 18' is assembled by the following procedures. Combine the left end of the front magazine element 19' with the front end of the left-hand magazine element 20' in such a manner that the small hole 29' is in alignment with the female thread 37'. Then, place the front magazine element 29' and the left-hand element 20' on the elevations 40a' and 40b', respectively, on the bottom plate 22'. Insert screws 26' and 28' into the small holes 45' and 46', respectively, in the bottom plate 22', and fix by threading the screws 26' and 28' into the female threads 27' and 37 in the magazine elements 19' and 20', respectively. Insert the screw 35' into the small hole 47' in the bottom plate 22' through the small hole 48b' in the leaf spring 48', and fix by threading the screw 35' into the female thread 36' in the left-hand magazine element 20'. When the bottom plate 22' is fixed to the magazine element 20', the contact 48a of the leaf spring 48' is simultaneously inserted into the slot 42'.

Subsequently, insert the peripheral portions 11' of the trays 1A' to 1F' into the grooves 24' in the front magazine element 19' and into the grooves 31' in the left-hand magazine element 20', with care being taken so that the shaft holes 7' formed in the trays 1A' to 1F' come into alignment with the shaft hole 33' formed in the left-hand magazine element 20' while the slots 10' made in the trays are in alignment with the hole 34' formed in the same magazine element 20'. After alignment is established between the shaft holes 7' and 33', insert the pin 8' until its lower end is fitted into the hole or recess 41' in the bottom plate 22'. In this case, the head of the pin 8' extends beyond the top surface of the magazine element 20'. In addition, after alignment is obtained between the slots 10' in the trays 1A' to 1F' and the hole 34' in the magazine element 20', insert a plurality of steel balls 9 such that one steel ball contacts the underlying ball at a position within the slot 10'.

Then, place the top plate 21' on the front magazine element 19' and the left-hand element 20', and insert the head of the pin 8' into the hole or recess 41' in the plate 21'. insert screws 26' and 28' into the small holes 45' and 48', respectively, in the plate 21', and fix by threading these screws into the female threads 27' and 37', respectively. Insert the screw 35' into the small hole 47' in the top plate 21' through the small hole 48b' in the leaf spring 48', and fix by threading the screw 35' into the female thread 36'. When the top plate 21' is fixed to the magazine element 20', the contact 48a' of the leaf spring 48' is simultaneously inserted into the slot 42' in the plate 21'. The steel balls 9' contained in the slots 10' and the holes 34' in the magazine elements 20' are urged against each other by means of the resiliency of the upper and lower leaf springs 48'.

The magazine 18' that has been assembled by these procedures may be used in the following manner.

Suppose the case where the user wants to set the disk 2' on one of the trays 1A to 1F in the magazine 18'. If, as shown in FIG. 25, the user puts his finger on the contact 17' on the tray 1A' and pulls it toward himself, the tray 1A' rotates counterclockwise about the pin 8' to be withdrawn from the magazine through its rear end 18'.

As mentioned earlier in this specification, the contacts 17' on the stacked trays are staggered in position either forwardly or backwardly and the distance between the contact 17' and the shaft hole 7' (or pin 8') differs between two adjacent trays in a stack. Therefore, the desired tray 1A can be smoothly withdrawn from the magazine 18' by a single action without the finger on the swinging tray 1A' touching any other trays 1B' to 1F'. The withdrawal of other trays 1B' to 1F' is limited by means of contact between the recessed portion 5a' of the groove 5' and the stopper 55' formed on the rear surface of the left-hand magazine element 20'. Part of the periphery of the recess 3' in the tray 1A' is in agreement with the arched concave portions 43' formed in the top and bottom plates 21' and 22' and with the arched concave portion 15a' formed on the rear edge of each of the trays 1B' to 1F'. As shown, the concave portions 43' and 15a' correspond to the periphery of the disk 2'.

The action of the mechanism involved in withdrawing dry one of the trays 1A' to 1F' is hereunder described with reference to FIGS. 27 and 28. If, for example, the tray 1D' is withdrawn, the two adjacent steel balls 9' within the associated slot 10' are pushed apart, one moved upwardly and the other downwardly, by means of the peripheral portion 11'. As a result, the steel balls 9' will move into the space between each of the other trays (1A', 1B', 1C', 1E' and 1F') and the associated partition 30', and their returning motion is inhibited by the action of the peripheral portion 11' in the tray 1D', whereupon the trays 1A', 1B', 1C', 1E' and 1F' are locked in the immobile state.

When the withdrawn tray 1D' is pushed back toward its original position after the disk 2' is placed in the recess 3', the tray is reloaded into the magazine as it is guided along the associated groove 24' in the magazine element 19'. At the same time, the steel balls 9' that have been separated by the peripheral portion 11 will drop into the slot 10' in the tray 1D' and click into place. In this case, the disk 2' will not rattle in the vertical direction since the upper surface of the periphery on one side of the disk 2' is depressed under the partition 23' while the upper surface of the periphery on the opposite side of the disk is depressed under the partition 30'. In addition, if the radii of the arched portions 25' and 32' of the partitions 23' and 30' are properly selected, these partitions will depress only the periphery of the disk 2' without damaging its major surface on which information is recorded.

No two of the trays 1A' to 1F' can be withdrawn simultaneously because the steel balls 9' associated with such trays are compressed against each other. Application of any other external force such as in the case of shaking the magazine 18' is equivalent to an attempt to withdraw more than one tray and the resulting compressive force acting on the steel balls 9' will prevent accidental poppingout of the trays. When the trays 1A' to 1F' are accommodated within the magazine 18', the combined thicker portions 15' of the trays will protect the magazine from the infusion of dust by acting to close the opening 38.

The use of the disk container of the present invention in association with automatic playing is hereunder described with reference to FIG. 29. When the magazine 18' is loaded into the player (not shown), the locking member 44' is immobilized by the lock lever. When the disk 2' to be played is designated, the subchassis (not shown) moves stepwise in the vertical direction until its stops at the position of the tray on which the disk is placed. Then, the drive plate 52' swings and the arm 52a', extending into the opening 38', pushes the desired tray out of the magazine 18' until it is swung to make contact with the stopper 53'. During its swinging, the tray will accurately maintain its height since its guide member 12' is first directed by the guide 49', then by the guide 51' until it reaches the final position.

At the playing unit, the clamper (not shown), being inserted through the opening 4 from below, will lift the disk 2' above the recess 3' and press it against the turntable fixed to the rotational shaft of the spindle motor. As the disk 2' is caused to rotate, information is read therefrom by means of the pickup (not shown). It should be mentioned that while the disk 2' is moving in the vertical direction, both the arched portions 43' formed in the magazine 18' and the arched portion 15a' formed at the rear end of the trays (other than the one carrying the disk to be played) will serve as part of the means for guiding the periphery of the disk 2'.

When the playing of the disk ends, the clamper lowers to replace the disk 2' in the recess 3' in the associated tray. Thereafter, the drive plate 52' swings clockwise and the arm 52b' will push the tray back into the magazine 18'. For other procedures involved in the use of the disk container in association with automatic playing, see the description of the manual operation.

The disk container of the present invention comprises a plurality of trays 1A', 1B', 1C' . . . on which the disk 2' is to be placed and the magazine 18' for accommodating said trays; the magazine 18' is provided with partitions 23' and 30' that limit the vertical position of the trays, and the height of the underside of each partition is set at a value equal to that of the top of the disk 2' placed on the tray below. In accordance with the present invention, rattling of the disk 2' can be inhibited merely by loading the trays into the magazine 18' with the attendant advantage of the disk being protected from accidental damage. If any one of the trays is withdrawn from the magazine 18', the disk 2' can be freely loaded or unloaded, thereby providing great ease in handling during automatic playing.

We claim:

1. A disk container comprising a plurality of stacked trays on which disks are to be placed, and a magazine for accommodating said trays, at least one magazine element at a side of said magazine having partitions defined by spaced grooves sized to the thickness of said trays, and wherein said trays have peripheral portions fitted within said grooves with said tray peripheral portions overlapping the partitions with the trays fully positioned within the magazine, each tray having a manually accessible claw, and said claws being arranged in a forwardly and rearwardly offset alternate manner when received in said magazine, means for supporting said plurality of stacked trays for rotation about a common pivot axis parallel to the direction of stacking of said trays, and wherein said adjacent tray claws are at radially offset positions with respect to said common pivot axis to facilitate selective pivoting of a tray from a position internally of said disk container magazine for permitting placement of a disk on said selected tray or removal of said disk therefrom.

2. A disk container comprising a plurality of stacked trays on which disks are to be placed, a shallow circular recess within the center of each tray, the recess diameter being substantially equal to the diameter of the disk for receiving said disk, a magazine for accommodating said stacked trays, means carried by said magazine for mounting said trays for movement into and out of said magazine at right angles to the stacked direction of said trays, said magazine including at least one magazine element having partitions defined by spaced grooves sized to the thickness of said trays, said trays having peripheral portions fitted within the grooves and overlapping the partitions when the trays are fully positioned within said magazine, and wherein said recesses and said disks carried by said recessed are sized such that the disks have peripheral portions retentively held within said tray recesses by said partitions when said trays are fully positioned within said magazine.

3. The disk container according to claim 2, wherein said trays are stacked in a vertical direction, wherein the thickness of the peripheral portions of each tray within a slot groove between vertically adjacent partitions is equal to the groove distance between the partitions, said recesses are within upper surfaces of said trays, and the recess depth is equal to the thickness of the disk such that the peripheries of the disks are captured between the underside of an overlying vertical partition and the tray recess for retentively holding said disk.

4. The disk container according to claim 3, wherein the partitions facing the trays are of arched shape, wherein the disks have an information recording surface radially inwardly of the outside diameter of each disk, and wherein the disk is positioned with respect to the partition such that the outside diameter of each disk overlaps the partition so as to be partially captured by the underside of the overlying partition, with the information recording surface of the disk radially inwardly of said partition to prevent damage to the information recording system surface of the disk when the tray is fully positioned within said magazine, and wherein displacement of the disk from a position internally of the magazine to a position externally thereof by movement of the tray may be effected without damaging the information recording surface of the disks.

5. A disc container comprising a plurality of trays formed substantially in a rectangle in plan configuration and a housing adapted to hold said plurality of trays in a vertically stacked manner at a given pitch and to maintain said plurality of trays for rotation about a common vertical pivot axis, wherein an L-shaped opening is formed by a first side wall, in the vicinity of said tray common vertical pivot axis of said housing, and by a contiguous second side wall intersecting the first side wall remote from the pivot axis, and wherein said plurality of trays are rotatable through said L-shaped opening between a disk retraction position and a disk exchange position.

6. The disk container according to claim 5, wherein, when a tray is in the disk retraction position, the thickness of the tray positioned at the opening is substantially equal to the pitch in the stacked direction of the trays.

* * * * *